US012631849B2

(12) United States Patent　　　(10) Patent No.:　US 12,631,849 B2
Kwon et al.　　　　　　　　　　　(45) Date of Patent:　　May 19, 2026

(54) CAMERA MODULE

(71) Applicant: Samsung Electro-Mechanics Co., Ltd., Suwon-si (KR)

(72) Inventors: Young Hwan Kwon, Suwon-si (KR); Kum Kyung Lee, Suwon-si (KR); Nam Ki Park, Suwon-si (KR); Ta Kyoung Lee, Suwon-si (KR); Jung Seok Lee, Suwon-si (KR); Young Bok Yoon, Suwon-si (KR); Dong Yeon Shin, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/734,802

(22) Filed: Jun. 5, 2024

(65) Prior Publication Data

US 2024/0337806 A1　　Oct. 10, 2024

Related U.S. Application Data

(63) Continuation of application No. 18/093,045, filed on Jan. 4, 2023, now Pat. No. 12,032,219, which is a
(Continued)

(30) Foreign Application Priority Data

Apr. 30, 2019　(KR) ........................ 10-2019-0050936
Jul. 30, 2019　(KR) ........................ 10-2019-0092229

(51) Int. Cl.
　　*G02B 7/02*　　　　(2021.01)
　　*G02B 7/10*　　　　(2021.01)
(Continued)

(52) U.S. Cl.
　　CPC ............. *G02B 7/021* (2013.01); *G02B 7/102* (2013.01); *G02B 27/646* (2013.01); *G03B 5/00* (2013.01);
(Continued)

(58) Field of Classification Search
　　CPC .......... G02B 7/02; G02B 7/021; G02B 7/023; G02B 7/04; G02B 7/08; G02B 7/09;
(Continued)

(56) References Cited

U.S. PATENT DOCUMENTS 9,020,334 B1　4/2015　Suzuka
10,126,633 B2　11/2018　Avivi et al.
(Continued)

FOREIGN PATENT DOCUMENTS

CN　　101498827 A　8/2009
CN　　105278208 A　1/2016
(Continued)

OTHER PUBLICATIONS

Machine translation of CN 109143528 retrieved electronically from PE2E Search Jan. 12, 2026 (Year: 2019).*
(Continued)

*Primary Examiner* — Cara E Rakowski
(74) *Attorney, Agent, or Firm* — NSIP Law

(57)　　　　　　ABSTRACT

A camera module includes a housing; a plurality of movable lens modules disposed in an internal space of the housing and configured to be movable in an optical axis direction, each of the plurality of movable lens modules comprising at least one lens; and a stopper configured to prevent contact between at least two of the plurality of movable lens modules, wherein the stopper includes a frame mounted on the housing; an extension portion extending from the frame into the internal space of the housing to face a side of one movable lens module of the plurality of movable lens
(Continued)

modules in the optical axis direction; and a damping member disposed on the extension portion to face the side of the one movable lens module in the optical axis direction.

17 Claims, 27 Drawing Sheets

Related U.S. Application Data continuation of application No. 16/823,060, filed on Mar. 18, 2020, now Pat. No. 11,573,391.

(51) Int. Cl.
| | | |
|---|---|---|
| *G02B 13/00* | (2006.01) |
| *G02B 17/02* | (2006.01) |
| *G02B 27/64* | (2006.01) |
| *G03B 5/00* | (2021.01) |
| *G03B 13/36* | (2021.01) |

(52) U.S. Cl.
CPC .......... *G03B 13/36* (2013.01); *G02B 13/0065* (2013.01); *G02B 17/023* (2013.01)

(58) Field of Classification Search
CPC ...... G02B 7/10; G02B 7/102; G02B 13/0065; G02B 13/007; G03B 17/17
See application file for complete search history.

(56) References Cited

U.S. PATENT DOCUMENTS

| | | | |
|---|---|---|---|
| 10,334,146 B2 | 6/2019 | Im et al. | |
| 10,416,473 B2 | 9/2019 | Lee et al. | |
| 10,481,410 B2 | 11/2019 | Kim et al. | |
| 10,678,062 B2 | 6/2020 | Im et al. | |
| 10,816,756 B2 | 10/2020 | Lee et al. | |
| 11,573,391 B2 | 2/2023 | Kwon et al. | |
| 2004/0184124 A1 | 9/2004 | Ikegame et al. | |
| 2006/0109565 A1 | 5/2006 | Watanabe et al. | |
| 2009/0195898 A1 | 8/2009 | Naitou | |
| 2010/0033837 A1 | 2/2010 | Tsuzuki | |
| 2011/0026915 A1 | 2/2011 | Baik et al. | |
| 2014/0009631 A1 | 1/2014 | Topliss | |
| 2015/0049209 A1 | 2/2015 | Hwang et al. | |
| 2015/0050013 A1 | 2/2015 | Cadugan et al. | |
| 2015/0346453 A1* | 12/2015 | Cheong | H04N 23/57 |
| | | | 359/826 |
| 2015/0373272 A1 | 12/2015 | Lim et al. | |
| 2016/0147037 A1 | 5/2016 | Arai et al. | |
| 2016/0153547 A1 | 6/2016 | Shibata et al. | |
| 2016/0269617 A1 | 9/2016 | Tomita | |
| 2017/0115466 A1 | 4/2017 | Murakami et al. | |
| 2018/0109660 A1* | 4/2018 | Yoon | H04N 23/687 |
| 2018/0120674 A1 | 5/2018 | Avivi et al. | |
| 2018/0224665 A1 | 8/2018 | Im et al. | |
| 2018/0239162 A1* | 8/2018 | Lee | H04N 23/57 |
| 2018/0259787 A1 | 9/2018 | Kim et al. | |
| 2018/0364450 A1 | 12/2018 | Lee et al. | |
| 2018/0367714 A1 | 12/2018 | Im et al. | |
| 2019/0004328 A1 | 1/2019 | Lee et al. | |
| 2020/0363614 A1* | 11/2020 | Kwon | G03B 5/00 |
| 2020/0404181 A1* | 12/2020 | Lee | G03B 30/00 |
| 2021/0058537 A1 | 2/2021 | Saito | |
| 2021/0067667 A1* | 3/2021 | Yang | G02B 27/646 |

FOREIGN PATENT DOCUMENTS

| | | | |
|---|---|---|---|
| CN | 105650261 A | 6/2016 | |
| CN | 106647107 A | 5/2017 | |
| CN | 106687846 A | 5/2017 | |
| CN | 107015419 A | 8/2017 | |
| CN | 206489312 U | 9/2017 | |
| CN | 107533272 A | 1/2018 | |
| CN | 108398806 A | 8/2018 | |
| CN | 108572430 A | 9/2018 | |
| CN | 109143528 A * | 1/2019 | ............ H04N 23/51 |
| CN | 109151263 A * | 1/2019 | ............ H04N 23/51 |
| CN | 109218576 A | 1/2019 | |
| CN | 208588884 U | 3/2019 | |
| JP | 2006-276168 A | 10/2006 | |
| JP | 2009-244353 A | 10/2009 | |
| JP | 2010-107440 A | 5/2010 | |
| JP | 5124879 B2 | 1/2013 | |
| KR | 10-2015-0020951 A | 2/2015 | |
| KR | 10-2015-0047996 A | 5/2015 | |
| KR | 10-2015-0141247 A | 12/2015 | |
| KR | 10-1742500 B1 | 6/2017 | |
| KR | 10-2018-0023336 A | 3/2018 | |
| KR | 10-2018-0062732 A | 6/2018 | |
| KR | 10-2018-0071779 A | 6/2018 | |
| KR | 10-2018-0092251 A | 8/2018 | |
| KR | 10-2018-0098463 A | 9/2018 | |
| KR | 10-2018-0102946 A | 9/2018 | |
| KR | 10-2018-0137277 A | 12/2018 | |
| KR | 10-2018-0137278 A | 12/2018 | |
| KR | 10-2019-0004121 A | 1/2019 | |
| KR | 10-2019-0033035 A | 3/2019 | |
| KR | 10-2019-0035114 A | 4/2019 | |
| KR | 10-2019-0036372 A | 4/2019 | |
| KR | 20190036372 A * | 4/2019 | ............ G03B 13/36 |
| WO | WO-2018007981 A1 * | 1/2018 | ........... G02B 27/646 |

OTHER PUBLICATIONS

Machine translation of CN 109151263 retrieved electronically from PE2E Search Jan. 12, 2026 (Year: 2019).*
Machine translation of KR20190036372 retrieved electronically from PE2E Search Jan. 12, 2026 (Year: 2019).*
Korean Office Action issued on Nov. 18, 2020 in counterpart Korean Patent Application No. 10-2019-0085338 (9 pages in English and 7 pages in Korean).
Korean Office Action issued on Nov. 20, 2020, in counterpart Korean Patent Application No. 10-2019-0092229 (9 pages in English and 7 pages in Korean).
Korean Office Action issued on May 13, 2021, in counterpart Korean Patent Application No. 10-2019-0092229 (9 pages in English and 6 pages in Korean).
Korean Office Action issued on May 18, 2021, in counterpart Korean Patent Application No. 10-2019-0085338 (6 pages in English and 5 pages in Korean).
Chinese Office Action issued on Jun. 1, 2021, in counterpart Chinese Patent Application No. 202010342033.X (10 pages in English and 12 pages in Chinese).
Chinese Office Action issued on Jun. 1, 2021, in counterpart Chinese Patent Application No. 202010355478.1 (11 pages in English and 12 pages in Chinese).
Korean Office Action issued on Nov. 29, 2021, in counterpart Korean Patent Application No. 10-2019-0092229 (5 pages in English, 4 pages in Korean).
Chinese Office Action issued on Jan. 20, 2022, in counterpart Chinese Patent Application No. 202010355478.1 (6 pages in English, 7 pages in Chinese).
Chinese Office Action issued on Jan. 29, 2022 in counterpart Chinese Patent Application No. 202010342033.X (12 pages in English, 10 pages in Mandarin).
Korean Office Action issued on Jan. 18, 2024, in counterpart Korean Patent Application No. 10-2023-0059200 (11 pages in English, 8 pages in Korean).
Chinese Office Action issued on Mar. 14, 2024, in counterpart Chinese Patent Application No. 202211005502.4 (4 pages in English, 10 pages in Chinese).
Chinese Office Action issued on Mar. 22, 2024, in counterpart Chinese Patent Application No. 202211005912.9 (3 pages in English, 6 pages in Chinese).
Chinese Office Action issued on Nov. 21, 2025, in counterpart

(56)     References Cited

OTHER PUBLICATIONS

Chinese Patent Application No. 202510992533.0 (5 pages in English, 10 pages in Chinese).

* cited by examiner

IIIA–IIIA'

IIIB-IIIB'

Hall Signal = (Hall 1 + Hall 2 ) − (Hall 3 + Hall 4)

CAMERA MODULE

CROSS-REFERENCE TO RELATED APPLICATIONS

This application is a continuation of U.S. patent application Ser. No. 18/093,045 filed on Jan. 4, 2023, now U.S. Pat. No. 12,032,219 issued on Jul. 9, 2024, which is a continuation of U.S. patent application Ser. No. 16/823,060 filed on Mar. 18, 2020, now U.S. Pat. No. 11,573,391 issued on Feb. 7, 2023, which claims the benefit under 35 USC 119 (a) of Korean Patent Application Nos. 10-2019-0050936 filed on Apr. 30, 2019, and 10-2019-0092229 filed on Jul. 30, 2019, in the Korean Intellectual Property Office, the entire disclosures of which are incorporated herein by reference for all purposes.

BACKGROUND

1. Field

This application relates to a camera module.

2. Description of Related Art

Camera modules have generally been installed in portable electronic devices, such as tablet personal computers (PCs) and laptop computers, in addition to smartphones, and an autofocusing (AF) function, an optical image stabilization (OIS) function, and a zoom function have been added to camera modules for portable electronic devices.

To implement such functions, however, structures of camera modules have become complex and sizes of the camera modules have been increased, causing portable electronic devices in which the camera modules are mounted to increase in size.

Additionally, in the case of directly moving a lens or an image sensor for optical image stabilization, both the weight of the lens or the image sensor itself and the weights of other members to which the lens or the image sensor is attached need to be taken into consideration. This requires a driving force to be increased, thereby increasing power consumption.

Furthermore, to implement the AF and zoom functions, a certain amount of space needs to be provided in an optical axis direction to enable the lens to move in the optical axis direction. However, it may be difficult to implement such a configuration due to the thinness of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing; a plurality of movable lens modules disposed in an internal space of the housing and configured to be movable in an optical axis direction, each of the plurality of movable lens modules including at least one lens; and a stopper configured to prevent contact between at least two of the plurality of movable lens modules, wherein the stopper includes a frame mounted on the housing; an extension portion extending from the frame into the internal space of the housing to face a side of one movable lens module of the plurality of movable lens modules in the optical axis direction; and a damping member disposed on the extension portion to face the side of the one movable lens module in the optical axis direction.

The one movable lens module of the plurality of movable lens modules may be a first movable lens module, another one of the plurality of movable lens modules may be a second movable lens module disposed adjacent to the first movable lens module in the optical axis direction, the second lens module may include a space portion formed by removing a portion of the second lens module facing the first lens module in the optical axis direction, and the extension portion and the damping member may extend into the space portion of the second lens module to face the side of the first movable lens module in the optical axis direction.

The stopper may further include a first stopper configured to limit a movement of the first lens module in the optical axis direction; and a second stopper configured to limit a movement of the second lens module in the optical axis direction, wherein the frame, the extension portion, and the damping member may be a first frame, a first extension portion, and a first damping member, and the first stopper may include the first frame, the first extension portion, and the first damping member.

The second stopper may include a second frame mounted on the housing; a second extension portion extending from the second frame into the internal space of the housing to face a side of the second movable lens module in the optical axis direction; and a second damping member disposed on the second extension portion to face the side of the second movable lens module in the optical axis direction, and the first frame of the first stopper and the second frame of the second stopper may be integrally connected to each other.

The first stopper may be further configured to limit a movement of the first lens module in one direction in the optical axis direction, and the second stopper may be further configured to limit a movement of the second lens module in another direction in the optical axis direction opposite to the one direction in the optical axis direction.

The housing may include an insertion groove formed in an upper surface of a side wall of the housing, and the first frame may be inserted into the insertion groove.

The housing may include an insertion groove formed in an inner surface of a side wall of the housing; and the extension portion may be inserted into the insertion groove.

The stopper may further include a side wall mounting portion extending from the frame along an outer surface of a side wall of the housing.

The housing may include an insertion groove formed in the outer surface of the side wall of the housing, and the side wall mounting portion may be inserted into the insertion groove.

The camera module may further include a fixed lens module disposed at a fixed position in the internal space of the housing, the fixed lens module including at least one lens.

The camera module may further include three ball bearings disposed between a bottom surface of the housing and a lower surface of the fixed lens module.

The fixed lens module may be attached to the housing by an adhesive.

The lower surface of the fixed lens module or the bottom surface of the housing may include three guide grooves into which the three ball bearings are respectively partially inserted, and a position of the fixed lens module in the optical axis direction, a position of the fixed lens module in a first direction perpendicular to the optical axis direction, and a position of the fixed lens module in a second direction perpendicular to the optical axis direction and the first direction may be determined by the three guide grooves.

The three guide grooves may include a first guide groove having a shape of a triangular pyramid having its corners cut off, or a shape of a triangular pyramid having its corners cut off and having its tip cut off to form a flat bottom surface; a second guide groove extending in the optical axis direction and having a shape of a V, or a shape of a V having its tip cut off to form a flat bottom surface; and a third guide groove extending in the optical axis direction and having vertical sides and a flat bottom surface.

The first guide groove may contact a first one of the three ball bearings at three points, the second guide groove may contact a second one of the three ball bearings at two points, and the third guide groove may contact a third one of the three ball bearings at one point.

The three guide grooves may include a first guide groove extending in the optical axis direction and having a shape of a V, or a shape of a V having its tip cut off to form a flat bottom surface, the first guide groove further having side walls extending in the first direction, the side walls having protrusions extending in the second direction; a second guide groove extending in the optical axis direction and having a shape of a V, or a shape of a V having its tip cut off to form a flat bottom surface; and a third guide groove extending in the optical axis direction and having vertical sides and a flat bottom surface.

The first guide groove may contact a first one of the three ball bearings at four points, the second guide groove may contact a second one of the three ball bearings at two points, and the third guide groove may contact a third one of the three ball bearings at one point.

In another general aspect, a camera module includes a housing; a fixed lens module disposed at a fixed position in an internal space of the housing; and three ball bearings disposed between a lower surface of the fixed lens module and a bottom surface of the housing, wherein the lower surface of the fixed lens module or the bottom surface of the housing includes three guide grooves into which the three ball bearings are respectively partially inserted, and a position of the fixed lens module in an optical axis direction, a position of the fixed lens module in a first direction perpendicular to the optical axis direction, and a position of the fixed lens module in a second direction perpendicular to the optical axis direction and the first direction are determined by the three guide grooves.

The camera module may further include a plurality of movable lens modules disposed in the internal space of the housing and configured to be movable in the optical axis direction, each of the plurality of movable lens modules including at least one lens.

The plurality of movable lens modules may include a first movable lens module and a second movable lens module, the housing may include a first guide groove and a second guide groove both formed in a bottom surface of the housing and extending in the optical axis direction, and the camera module may further include three first ball bearings supporting a lower surface of the first movable lens module and including one first ball bearing disposed in the first guide groove and two second ball bearings disposed in the second guide groove; and three second ball bearings supporting a lower surface of the second movable lens module and including two second ball bearings disposed in the first guide groove and one second ball bearing disposed in the second guide groove.

The plurality of movable lens modules may include a first movable lens module and a second movable lens module, the housing may include a first guide groove, a second guide groove, a third guide groove, and a fourth guide groove all formed in a bottom surface of the housing, extending in the optical axis direction, and sequentially arranged in the first direction, and the camera module may further include three first ball bearings supporting a lower surface of the first movable lens module and including one first ball bearing disposed in the second guide groove and two first ball bearings disposed in the fourth guide groove; and three second ball bearings supporting a lower surface of the second movable lens module and including two second ball bearings disposed in the first guide groove and one second ball bearing disposed in the third guide groove.

In another general aspect, a camera module includes a housing; a first movable lens module disposed in an internal space of the housing and configured to be movable in an optical axis direction, the first movable lens module including at least one lens; a second movable lens module disposed in the internal space of the housing adjacent to the first movable lens module in the optical axis direction and configured to be movable in the optical axis direction, the second movable lens module including at least one lens; and a stopper mounted on an upper surface of the housing and extending into the internal space of the housing to prevent the first movable lens module and the second movable lens module from contacting one another as the first movable lens module and the second movable lens module move in the optical axis direction.

The stopper may include a frame mounted on the upper surface of the housing; a first extension portion extending from the frame into the internal space of the housing to face a surface of the first movable lens module; a first damping member disposed on the first extension portion to face the surface of the first movable lens module and contact the surface of the first movable lens module as the first movable lens module moves in one direction in the optical axis direction; a second extension portion extending from the frame into the internal space of the housing to face a surface of the second movable lens module; and a second damping member disposed on the second extension portion to face the surface of the second movable lens module and contact the surface of the second movable lens module as the second movable lens module moves in another direction in the optical axis direction opposite to the one direction.

The stopper may include a first frame mounted on the upper surface of the housing; a first extension portion extending from the first frame into the internal space of the housing to face a surface of the first movable lens module; a first damping member disposed on the first extension portion to face the surface of the first movable lens module and contact the surface of the first movable lens module as the first movable lens module moves in one direction in the optical axis direction; a second frame mounted on the upper surface of the housing; a second extension portion extending from the second frame into the internal space of the housing to face a surface of the second movable lens module; and a second damping member disposed on the second extension portion to face the surface of the second movable lens module and contact the surface of the second movable lens module as the second movable lens module moves in another direction in the optical axis direction opposite to the one direction.

The camera module may further include a fixed lens module disposed at a fixed position in the internal space of the housing adjacent to the second movable lens module in the optical axis direction so that the second movable lens module is disposed between the first movable lens module and the fixed lens module, the fixed lens module including at least one lens, wherein a lower surface of the fixed lens module may include three grooves, a bottom surface of the housing may include three grooves opposing the three grooves in the lower surface of the fixed lens module, the camera module may further include three ball bearings partially inserted into the three grooves in the lower surface of the fixed lens module and the three grooves in the bottom surface of the housing to support the fixed lens module in the housing, the grooves into which a first ball bearing of the three ball bearings is partially inserted may have a shape configured to constrain the fixed lens module in the optical axis direction, a first direction perpendicular to the optical axis direction, and a second direction perpendicular to the optical axis direction and the first direction, the grooves into which a second ball bearing of the three ball bearings is partially inserted may have a shape configured to constrain the fixed lens module in the first direction and the second direction, and the grooves into which a third ball bearing of the three ball bearings is partially inserted may have a shape configured to constrain the fixed lens module in the second direction.

In another general aspect, a camera module includes a housing; and a fixed lens module disposed at a fixed position in an internal space of the housing, the fixed lens module including at least one lens, wherein a lower surface of the fixed lens module includes three grooves, a bottom surface of the housing includes three grooves opposing the three grooves in the lower surface of the fixed lens module, the camera module further includes three ball bearings partially inserted into the three grooves in the lower surface of the fixed lens module and the three grooves in the bottom surface of the housing to support the fixed lens module in the housing, the grooves into which a first ball bearing of the three ball bearings is partially inserted have a shape configured to constrain the fixed lens module in an optical axis direction, a first direction perpendicular to the optical axis direction, and a second direction perpendicular to the optical axis direction and the first direction, the grooves into which a second ball bearing of the three ball bearings is partially inserted have a shape configured to constrain the fixed lens module in the first direction and the second direction, and the grooves into which a third ball bearing of the three ball bearings is partially inserted have a shape configured to constrain the fixed lens module in the second direction.

The three guide grooves in the lower surface of the fixed lens module and the three grooves in the bottom surface of the housing may each include a first guide groove having a shape of a triangular pyramid having its corners cut off, or a shape of a triangular pyramid having its corners cut off and having its tip cut off to form a flat bottom surface; a second guide groove extending in the optical axis direction and having a shape of a V, or a shape of a V having its tip cut off to form a flat bottom surface; and a third guide groove extending in the optical axis direction and having vertical sides and a flat bottom surface.

The three guide grooves in the lower surface of the fixed lens module and the three grooves in the bottom surface of the housing may each include a first guide groove extending in the optical axis direction and having a shape of a V, or a shape of a V having its tip cut off to form a flat bottom surface, the first guide groove further having side walls extending in the first direction, the side walls having protrusions extending in the second direction; a second guide groove extending in the optical axis direction and having a shape of a V, or a shape of a V having its tip cut off to form a flat bottom surface; and a third guide groove extending in the optical axis direction and having vertical sides and a flat bottom surface.

The camera module may further include a first movable lens module disposed in the internal space of the housing and configured to be movable in the optical axis direction, the first movable lens module including at least one lens; a second movable lens module disposed in the internal space of the housing between the first movable lens module and the fixed lens module in the optical axis direction and configured to be movable in the optical axis direction, the second movable lens module including at least one lens; and a stopper mounted on an upper surface of the housing and extending into the internal space of the housing to prevent the first movable lens module and the second movable lens module from contacting one another as the first movable lens module and the second movable lens module move in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
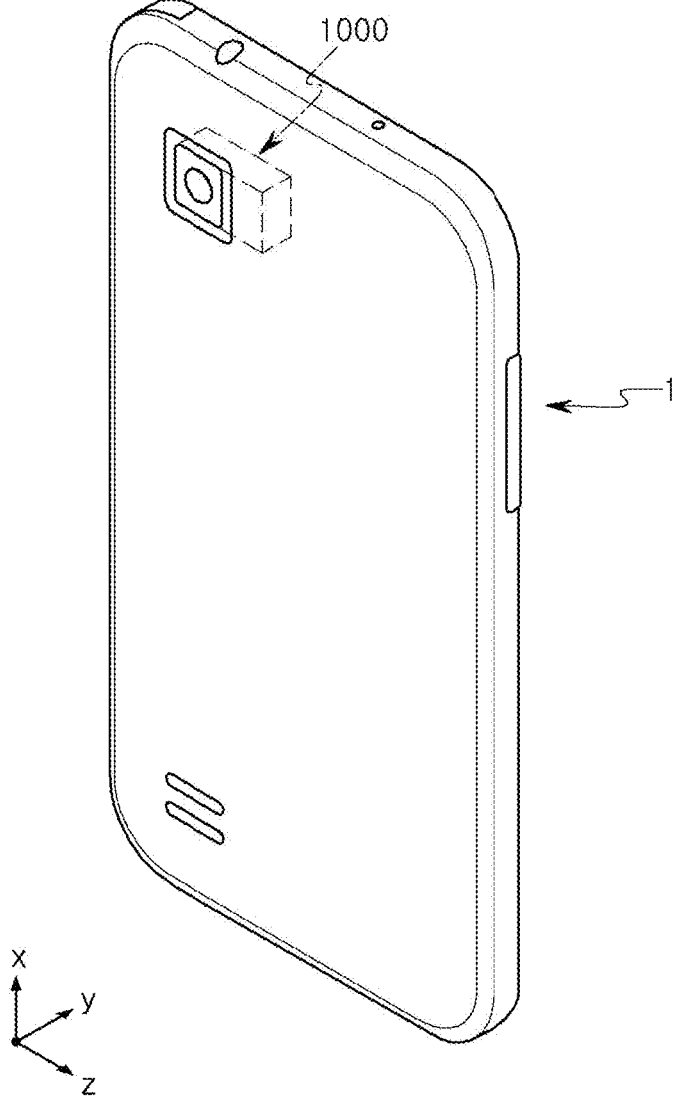
FIG. 1 is a perspective view of an example of a portable electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of an example of a portable electronic device.

Referring to FIG. 1, a portable electronic device 1 may be a portable electronic device 1, such as a mobile communications terminal, a smartphone, or a tablet personal computer (PC), in which a camera module 1000 is mounted.

The portable electronic device 1 may be provided with the camera module 1000 to capture an image of a subject.

In this example, the camera module 1000 may include a plurality of lenses, and an optical axis (a Z-axis) of the lenses may be oriented in a direction perpendicular to a thickness direction (a Y-axis direction, or a direction from a front surface of the portable electronic device 1 to a rear surface thereof, or an opposite direction from the rear surface of the portable electronic device 1 to the front surface thereof) of the portable electronic device 1.

In this example, the optical axis (the Z-axis) of the plurality of the lenses disposed in the camera module 1000 may be oriented in a width direction (a Z-axis direction) or a length direction (an X-axis direction) of the portable electronic device 1.

Therefore, even when the camera module 1000 has the AF, zoom, and OIS functions, a thickness of the portable electronic device 1 may not increase. Therefore, the portable electronic device 1 may be made thinner.

The camera module 1000 may have the AF, zoom, and OIS functions.

The camera module 1000 having the AF, zoom, and OIS functions requires various components, leading to an increased size of the camera module 1000 compared to a conventional camera module.

The increased size of the camera module 1000 may make it difficult to miniaturize the portable electronic device 1 in which the camera module 1000 is mounted.

For example, a number of stacked lenses in the camera module may be increased to implement the zoom function. When multiple lenses are stacked in the thickness direction of the portable electronic device 1, the thickness of the portable electronic device 1 may increase, depending on the number of the stacked lenses. Therefore, a sufficient number of the stacked lenses may not be provided without increasing the thickness of the portable electronic device 1, thereby deteriorating the zoom function.

Furthermore, to implement the AF, zoom, and OIS functions, an actuator moving a plurality of lens groups in the optical axis direction or a direction perpendicular to the optical axis direction. When the optical axis (the Z-axis) of the lens groups is oriented in the thickness direction of the portable electronic device 1, the actuator for moving the lens groups should also be installed in the thickness direction. Therefore, the thickness of the portable electronic device 1 may increase.

If the optical axis (the Z-axis) of the plurality of lenses is oriented to be perpendicular to the thickness direction of the portable electronic device 1, the portable electronic device 1 may be made thinner even when the camera module 1000 having the AF, zoom, and OIS functions is mounted in the portable electronic device 2.

Figure 2:
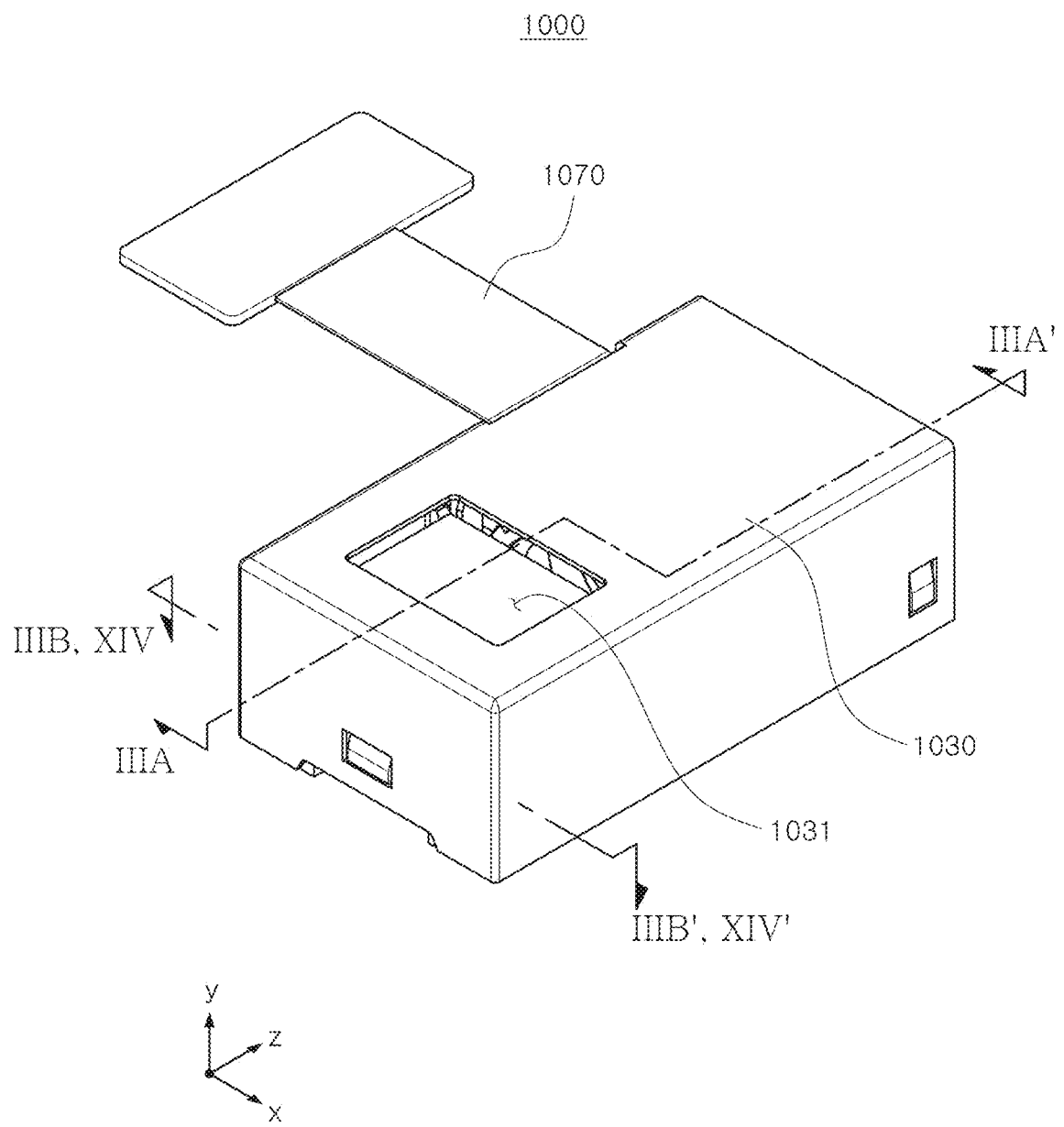
FIG. 2 is a perspective view of an example of a camera module.
Figure 3A:
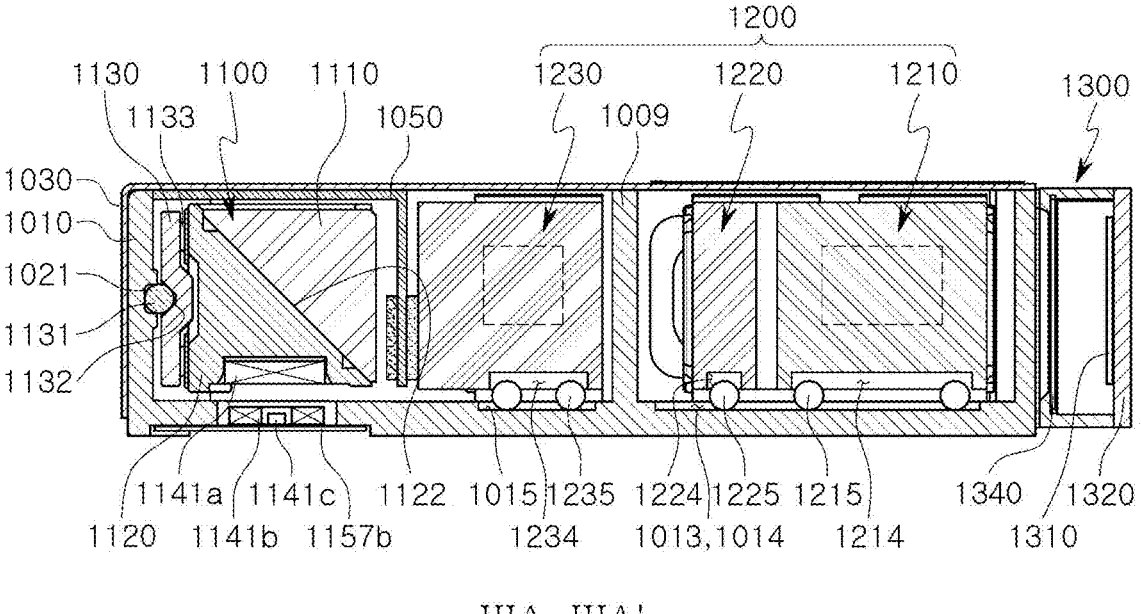
FIGS. 3A and 3B are cross-sectional views of an example of a camera module taken along the lines IIIA-IIIA' and IIIB-IIIB' in FIG. 2.
Figure 3A:
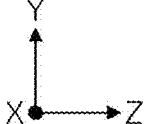
Figure 3B:
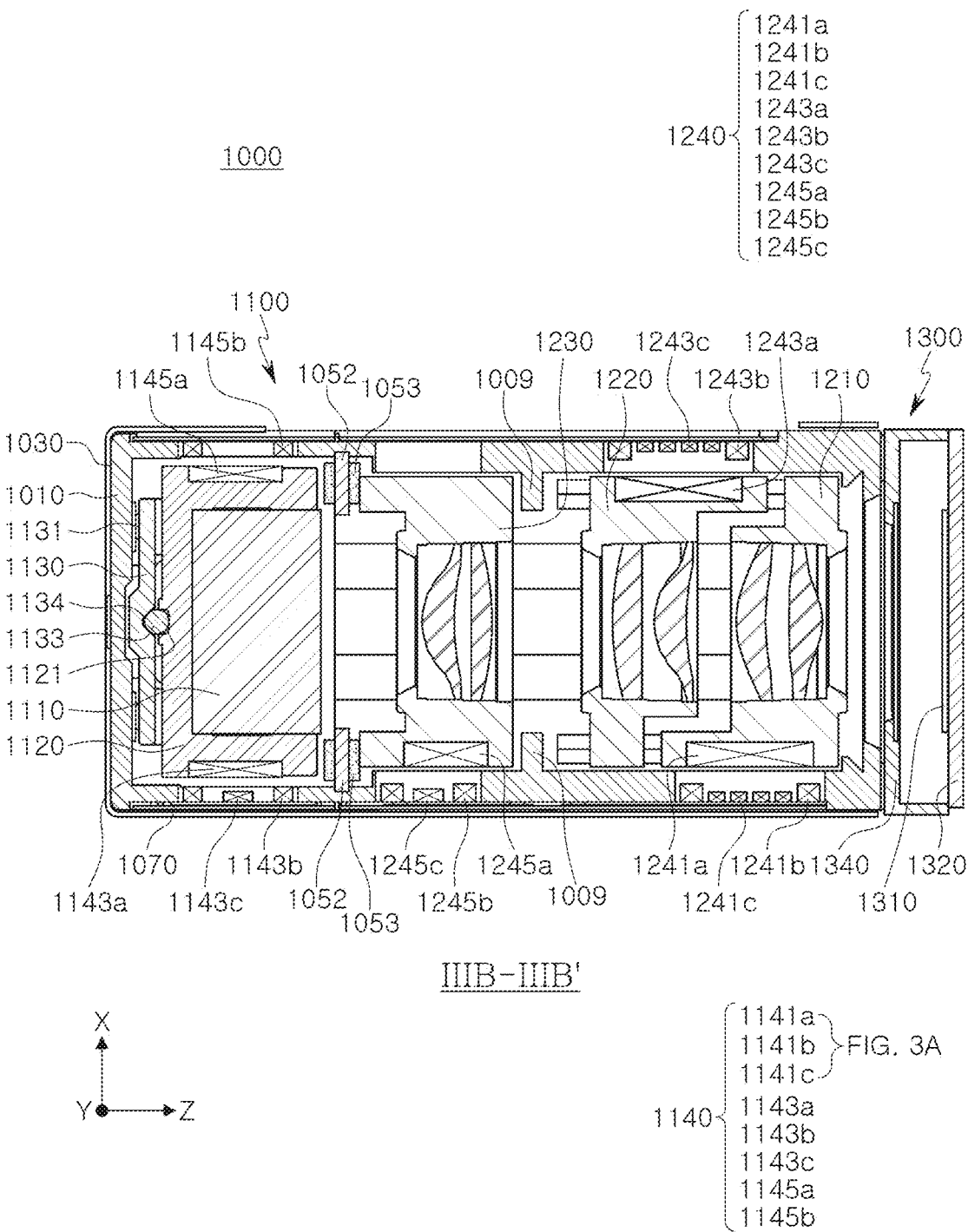
Figure 4:
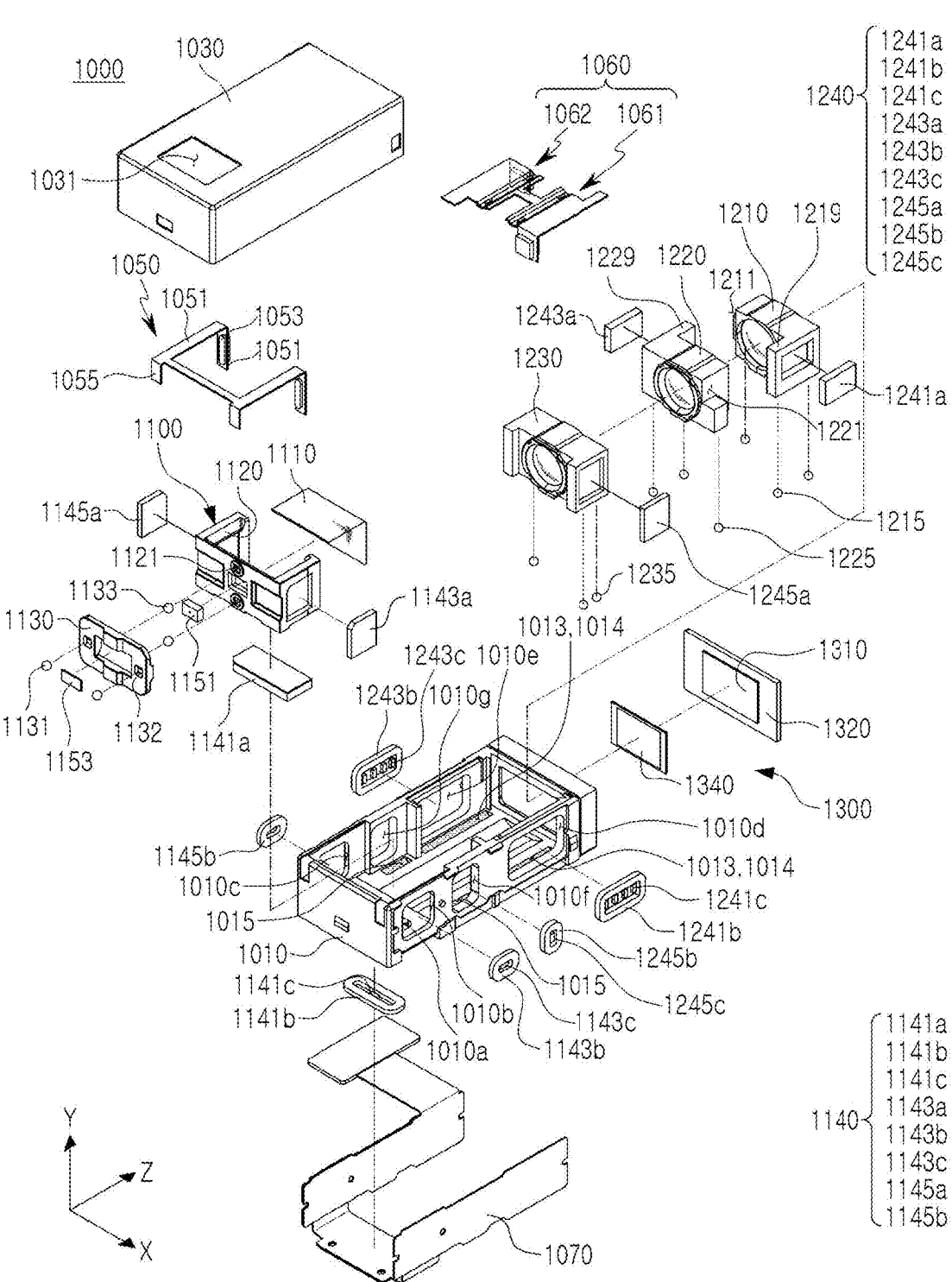
FIG. 4 is an exploded perspective view of an example of a camera module.
Figure 5:
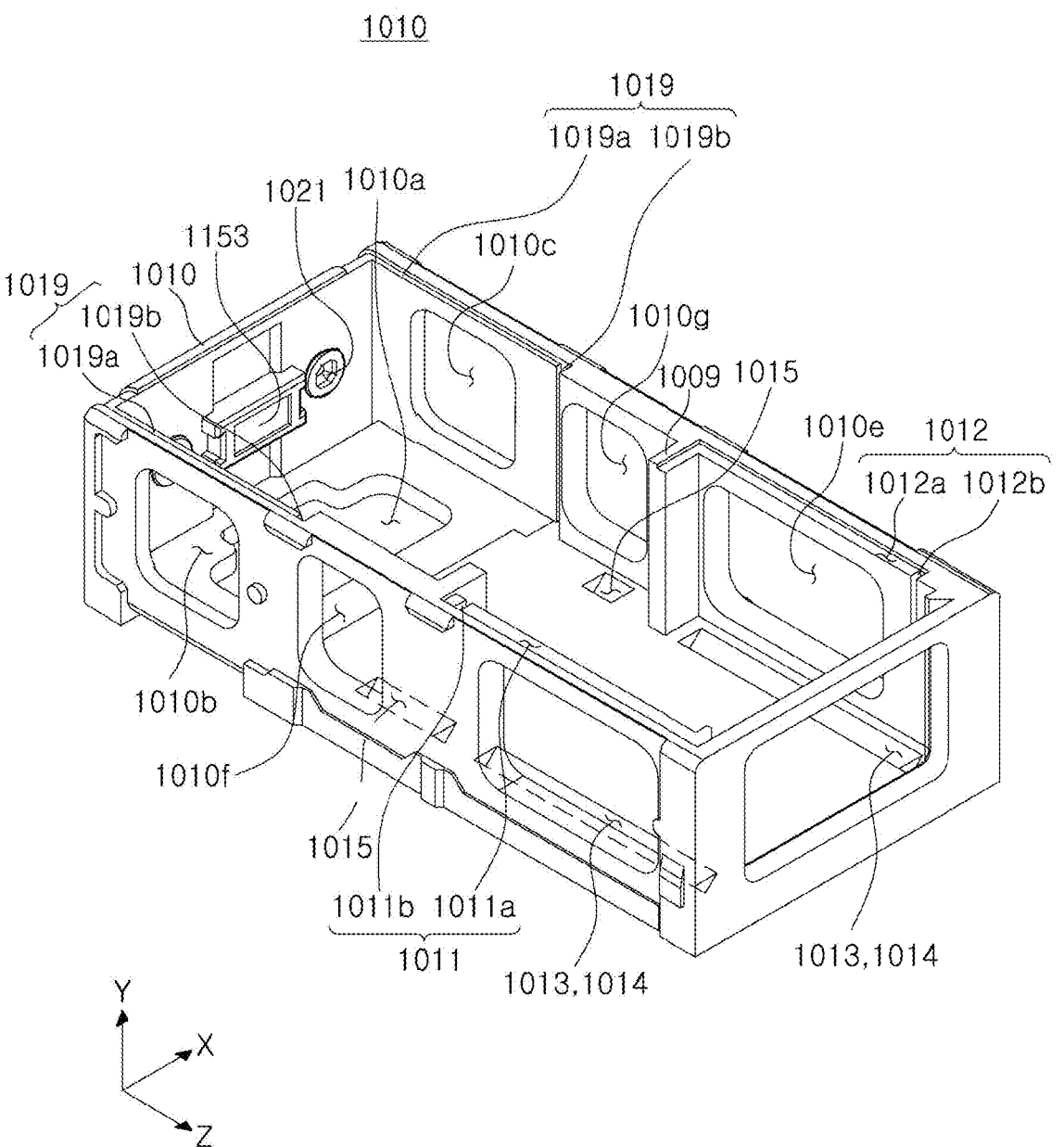
FIG. 5 is a perspective view of an example of a housing of a camera module.

FIG. 2 is a perspective view of an example of a camera module, FIGS. 3A and 3B are cross-sectional views of an example of a camera module taken along the lines IIIA-IIIA' and IIIB-IIIB' in FIG. 2, and FIG. 4 is an exploded perspective view of an example of a camera module.

Referring to FIGS. 2 to 4, the camera module 1000 may include a reflection module 1100, a lens module 1200, and an image sensor module 1300 disposed in a housing 1010.

The reflection module 1100 may be configured to change a propagation direction of light. As an example, a propagation direction of light incident through an opening portion 1031 of a cover 1030 covering an upper portion of the camera module 1000 may be changed to a direction toward the lens module 1200 through the reflection module 1100. To this end, the reflection module 1100 may include a reflective member 1110 configured to reflect the light.

For example, a path of light incident in the thickness direction (the Y-axis direction) of the camera module 1000 may be changed by the reflection module 1100 so that the propagation direction of the incident light may be approximately the same as the optical axis (the Z-axis) direction.

The lens module 1200 may include a plurality of lenses through which passes the light having the propagation direction changed by the reflection module 1100. The lens module 1200 may include at least three lens barrels 1210, 1220, and 1230. The three lens barrels 1210, 1220, and 1230 are sometimes referred to in this application as a first lens barrel 1210, a second lens barrel 1220, and a third lens barrel 1230. The AF and zoom functions may be implemented according to the movements of the at least three lens barrels 1210, 1220, and 1230 in the optical axis (the Z-axis) direction. In addition, in this example, any one lens barrel, for example, the lens barrel 1230, of the at least three lens barrels 1210, 1220, and 1230 may be fixed so that it cannot move in the optical axis direction. The AF and zoom functions may be implemented by the fixed lens barrel 1230 and the remaining two lens barrels 1210 and 1220.

The image sensor module 1300 may include an image sensor 1310 for converting the light that has passed through the plurality of lenses into an electrical signal, and a printed circuit board 1320 on which the image sensor 1310 may be mounted. Furthermore, the image sensor module 1300 may include an optical filter 1340 filtering the light that has passed through the lens module 1200. The optical filter 1340 may be an infrared cut-off filter.

In an internal space of the housing 1010, the reflection module 1100 may be disposed in front of the lens module 1200, and the image sensor module 1300 may be disposed behind the lens module 1200.

Referring to FIGS. 2 to 21, the camera module 1000 may include the reflection module 1100, the lens module 1200, and the image sensor module 1300, which may be disposed in the housing 1010.

The reflection module 1100, the lens module 1200, and the image sensor module 1300 may be sequentially disposed from a front end of the housing 1010 toward a rear end of the housing 1010. The housing 1010 may have an internal space that is large enough so that all of the reflection module 1100, the lens module 1200, and the image sensor module 1300 may be disposed in the internal space of the housing 1010. The printed circuit board 1320 included in the image sensor module 1300 may be attached to an outside of the housing 1010.

For example, as illustrated in the drawings, the housing 1010 may be a single housing so that the reflection module 1100 and the lens module 1200 may be disposed in the internal space of the housing 1010. However, the configuration of the housing 1010 is not limited thereto. For example, separate housings in which the reflection module 1100 and the lens module 1200 are respectively disposed may be connected to each other.

The housing 1010 may be covered with the cover 1030 so that the internal space of the housing 1010 is not exposed.

The cover 1030 may include the opening portion 1031 so that light is incident therethrough, and the propagation direction of the light incident through the opening portion 1031 may be changed by the reflection module 1100, causing the light to be incident on the lens module 1200. The cover 1030 may be a single cover covering the entire housing 1010, or may be divided into separate covers respectively covering the reflection module 1100 and the lens module 1200.

The reflection module 1100 may include the reflective member 1110 reflecting light. Furthermore, the light incident on the lens module 1200 may pass through the plurality of lens groups (the at least three lens barrels 1210, 1220, and 1230), and may be then converted into an electrical signal by the image sensor 1310 and stored in a memory (not shown).

The housing 1010 may include the reflection module 1100 and the lens module 1200 disposed in the internal space of the housing 1010. The reflection module 1100 may be disposed at the front end of the internal space of the housing 1010, and the lens module 1200 may be disposed at the rear end of the internal space of the housing 1010. In addition, spaces in which the lens barrels 1210, 1220, and 1230 of the lens module 1200 may be provided may be separated from each other by protruding walls 1009. The protruding walls 1009 may be protrude from both side walls of the housing 1010 into the internal space of the housing 1010.

The reflection module 1100 disposed at the front end of the internal space of the housing 1010 may include a rotating holder 1120 closely adhered to and supported on an inner surface of a front wall of the housing 1010 by an attractive force between a pulling yoke 1153 disposed on the inner surface of the front wall of the housing 1010 and a pulling magnet 1151 disposed on the rotating holder 1120. Alternatively, although not illustrated in the drawings, a pulling magnet may be disposed on the inner surface of the front wall of the housing 1010, and a pulling yoke may be disposed on the rotating holder 1120. Hereinafter, the structure illustrated in the drawings will be described for convenience of explanation.

First ball bearings 1131, a rotation plate 1130, and second ball bearings 1133 may be disposed between the inner surface of the front wall of the housing 1010 and the rotating holder 1120.

As will be described in detail below, the first ball bearings 1131 and the second ball bearings 1133 may be partially inserted into guide grooves 1021, 1132, 1121, and 1134. A small space may be needed between the rotating holder 1120 and the third lens barrel 1230 to enable the rotating holder 1120 and the rotation plate 1130 to be disposed in the internal space of the housing 1010. When the rotating holder 1120 is mounted on the housing 1010, the rotating holder 1120 may be closely adhered to the inner surface of the front wall of the housing 1010 by the attractive force between the pulling yoke 1153 and the pulling magnet 1151, thereby maintaining a small space between the rotating holder 1120 and the third lens barrel 1230.

In this example, a damper 1050 may be mounted on an upper portion of the housing 1010 to support the rotating holder 1120. Alternatively, without the damper 1050, the attractive force between the pulling magnet 1151 and the pulling yoke 1153 may support the rotating holder 1120.

The damper 1050 may include a frame 1051 mounted on upper surfaces of side walls of the housing 1010 and an upper surface of a front wall of the housing 1010, locking portions 1055 extending downwardly perpendicular to the optical axis direction from a front end of the frame 1051, extension portions 1052 extending downwardly perpendicular to the optical axis direction from rear ends of the frame 1051, and damping members 1053 disposed on the extension portions 1052 and protruding toward and away from the rotating holder 1120 in the optical axis direction. The damping members 1053 may be inserted into through-holes formed in the extension portions 1052. The damping members 1053 may be made of any elastic material, such as urethane, silicone, epoxy, or a polymer material.

The locking portions 1055 may be clipped onto the front wall of the housing 1010 to lock the damper 1050 to the housing 1010. The housing 1010 may be provided with insertion grooves 1019 into which the frame 1051 the extension portions 1052, and the locking portions 1055 are inserted. The insertion grooves 1019 may include first insertion grooves 1019a extending in the optical axis direction along inner edges of upper surfaces of side walls of the housing and formed in inner portions of the upper surfaces of the side walls of the housing 1010 and in an upper surface of a front wall of the housing 1010, second insertion grooves 1019b extending downwardly perpendicular to the optical axis direction from rear ends of the first insertion groove 1019a and formed in inner surfaces of the side walls of the housing 1010, and third insertion grooves 1019c extending downwardly perpendicular to the optical axis direction from front ends of the first insertion grooves 1019a and formed in an outer surface of the front wall of the housing 1010.

The frame 1051 may be inserted into the first insertion grooves 1019a, the locking portions 1055 provided at one end of the frame 1051 may be inserted into the third insertion grooves 1019c along the outside of the housing 1010, and the extension portions 1052 provided at the other end of the frame 1051 may be inserted into the second insertion grooves 1019b, the frame 1051 may be firmly fixed so that it cannot move in the optical axis direction. In addition, an adhesive may be applied between the frame 1051 and the housing 1010 to bond the frame 1051 and the housing 1010 to each other.

The damping members 1053 may be inserted into through-holes formed in the extension portions 1052. Alternatively, the damping members 1053 may be attached to both sides of the extension portions 1052 by an adhesive. The damping members 1053 may protrude from both sides of the extension portions 1052 in the optical axis direction. The damping members 1053 may serve as a damper for absorbing the shock of the rotating holder 1120 or a stopper for limiting the moving distance of the rotating holder 1120, and the third lens barrel 1230 may be fixed (FIG. 6B). In this case, the third lens barrel 1230 may serve to support one side of the damping members 1053 in the optical axis direction.

The damper 1050 may serve as brackets supporting the rotating holder 1120 when the reflection module 1100 is not being driven, and may serve as a damper or a stopper controlling movement of the rotating holder 1120 when the reflection module 1100 is being driven. A space may be provided between the damper 1050 and the rotating holder 1120 to allow the rotating holder 1120 to rotate smoothly. Alternatively, even when the damper 1050 is in contact with the rotating holder 1120, the damping members 1053 may be made of an elastic material to allow the rotating holder 1120 to move smoothly while being supported by the damper 1050.

The housing 1010 may include a first driving portion 1140 and a second driving portion 1240 provided for respectively driving the reflection module 1100 and the lens module 1200. The first driving portion 1140 may include a plurality of coils 1141b, 1143b, and 1145b for driving the reflection module 1100, and the second driving portion 1240 may include a plurality of coils 1241b, 1243b, and 1245b for driving the lens module 1200, where the lens module 1200 may include the first lens barrel 1210, the second lens barrel 1220, and the third lens barrel 1230.

Furthermore, since the plurality of coils 1141b, 1143b, 1145b, 1241b, 1243b, and 1245b may be provided in the housing 1010 in a state in which they are mounted on a main board 1070, the housing 1010 may be provided with a plurality of through-holes 1010*a*, 1010*b*, 1010*c*, 1010*d*, 1010*e*, 1010*f*, and 1010*g* so that the plurality of coils 1141*b*, 1143*b*, 1145*b*, 1241*b*, 1243*b*, and 1245*b* may be exposed to the internal space of the housing 1010.

The main board 1070 on which the coils 1141*b*, 1143*b*, 1145*b*, 1241*b*, 1243*b*, and 1245*b* may be mounted may be provided as a single board as illustrated in the drawings. In this case, a single terminal portion may be provided, thereby making it easy to connect the main board 1070 to an external power supply and external signal lines. However, the main board 1070 is not limited to such a configuration, and may also be provided as a plurality of boards by separating a board on which the coils 1141*b*, 1143*b*, and 1145*b* for driving the reflection module 1100 are mounted from a board on which the coils 1241*b*, 1243*b*, and 1245*b* for driving the lens module 1200 are mounted.

The reflection module 1100 may change a path of light incident through the opening portion 1031. When a still image or a moving image is captured, the still image may be blurred or the moving image may be shaken due to a hand-shake or other movement of a user. In this case, the reflection module 1100 may stabilize the hand-shake or other movement of the user by moving the rotating holder 1120 on which the reflective member 1110 is mounted. For example, when shaking is generated at the time of capturing a still image or a moving image due to a hand-shake or other movement of a user, the rotating holder 1120 may be moved by a relative displacement corresponding to the shaking to compensate for the shaking.

The OIS function may be implemented by a movement of the rotating holder 1120 having a relatively low weight since it does not include lenses or coils, and thus power consumption for the OIS function may be significantly reduced.

For example, for the OIS function implementation, the propagation direction of the light may be changed by moving the rotating holder 1120 on which the reflective member 1110 is provided without moving the lens barrels 1210, 1220, and 1230 including a plurality of lenses of the lens module 1200 or the image sensor 1310 so that the light on which the OIS is performed may be incident to the lens module 1200.

The reflection module 1100 may include the rotating holder 1120 supported by the housing 1010 via the rotation plate 1130, the reflective member 1110 mounted on the rotating holder 1120, and the first driving portion 1140 for moving the rotating holder 1120.

The reflective member 1110 may change a propagation direction of light. For example, the reflective member 1110 may be a mirror or a prism reflecting the light. For convenience of illustration, the reflective member 1110 has been illustrated as a prism in the drawings.

The reflective member 1110 may be fixed to the rotating holder 1120. The rotating holder 1120 has a mounting surface 1122 on which the reflective member 1110 is mounted.

The mounting surface 1122 of the rotating holder 1120 may be an inclined surface so that a path of light changes reflected by the reflective member 1110 mounted on the mounting surface 1122. The mounting surface 1122 may be a surface inclined with respect to the optical axis (the Z-axis) of the plurality of the lenses by 30° to 60°. The inclined surface of the rotating holder 1120 may be directed toward the opening portion 1031 of the cover 1030 on which light is incident.

The rotating holder 1120 on which the reflective member 1110 is mounted may be mounted to be movable in the internal space of the housing 1010. For example, the rotating holder 1120 may be mounted in the housing 1010 to be rotatable around a first axis (the X-axis) and a second axis (the Y-axis). The first axis (the X-axis) and the second axis (the Y-axis) may be axes perpendicular to the optical axis (the Z-axis), and may be perpendicular to each other.

The rotating holder 1120 may be supported in the housing 1010 by the first ball bearings 1131 aligned along the first axis (the X-axis) and the second ball bearings 1133 aligned along the second axis (the Y-axis) so that the rotating holder 1120 rotates smoothly around the first axis (the X-axis) and the second axis (the Y-axis). As an example, two first ball bearings 1131 are aligned along the first axis (the X-axis) and two second ball bearings 1133 are aligned along the second axis (the Y-axis) as illustrated in the drawings. The rotating holder 1120 may be rotated around the first axis (the X-axis) and the second axis (the Y-axis) by the first driving portion 1140, as described below.

Furthermore, the first ball bearings 1131 and the second ball bearings 1133 may be provided on a front surface and a rear surface of the rotation plate 1130, respectively. Alternatively, the first ball bearings 1131 and the second ball bearings 1133 may be provided on a rear surface and a front surface of the rotation plate 1130, respectively. That is, the first ball bearings 1131 may be aligned along the second axis (the Y-axis) and the second ball bearings 1133 may be aligned along the first axis (the X-axis). However, the structure illustrated in the drawings will hereinafter be described for convenience of explanation. The rotation plate 1130 may be provided between the rotating holder 1120 and the inner surface of the front wall of the housing 1010.

The rotating holder 1120 may be supported in the housing 1010 via the first ball bearings 1131 provided between the housing 1010 and the rotation plate 1130, the rotation plate 1130, and the second ball bearings 1133 provided between the rotation plate 1130 and the rotating holder 1120 by the attractive force between the pulling magnet 1151 or the pulling yoke provided on the rotating holder 1120 and the pulling yoke 1153 or the pulling magnet provided on the housing 1010.

The guide grooves 1132 and 1134 may be provided on the front surface and the rear surface of the rotation plate 1130 so that the first ball bearings 1131 and the second ball bearings 1133 may be inserted into the guide grooves 1132 and 1134. The guide grooves 1132 and 1134 may include first guide grooves 1132 into which the first ball bearings 1131 are partially inserted, and second guide grooves 1134 into which the second ball bearings 1133 are partially inserted.

The housing 1010 may be provided with third guide grooves 1021 into which the first ball bearings 1131 are partially inserted, and the rotating holder 1120 may be provided with fourth guide grooves 1121 into which the second ball bearings 1133 are partially inserted.

The first guide grooves 1132, the second guide grooves 1134, the third guide grooves 1021, and the fourth guide grooves 1121 described above may have a hemispherical or polygonal (polyprismatic or polypyramidal) groove shape so that the first ball bearings 1131 and the second ball bearings 1133 may easily rotate.

The first ball bearings 1131 and the second ball bearings 1133 may serve as bearings while rolling or sliding in the first guide grooves 1132, the second guide grooves 1134, the third guide grooves 1021, and the fourth guide grooves 1121.

Figure 8A:
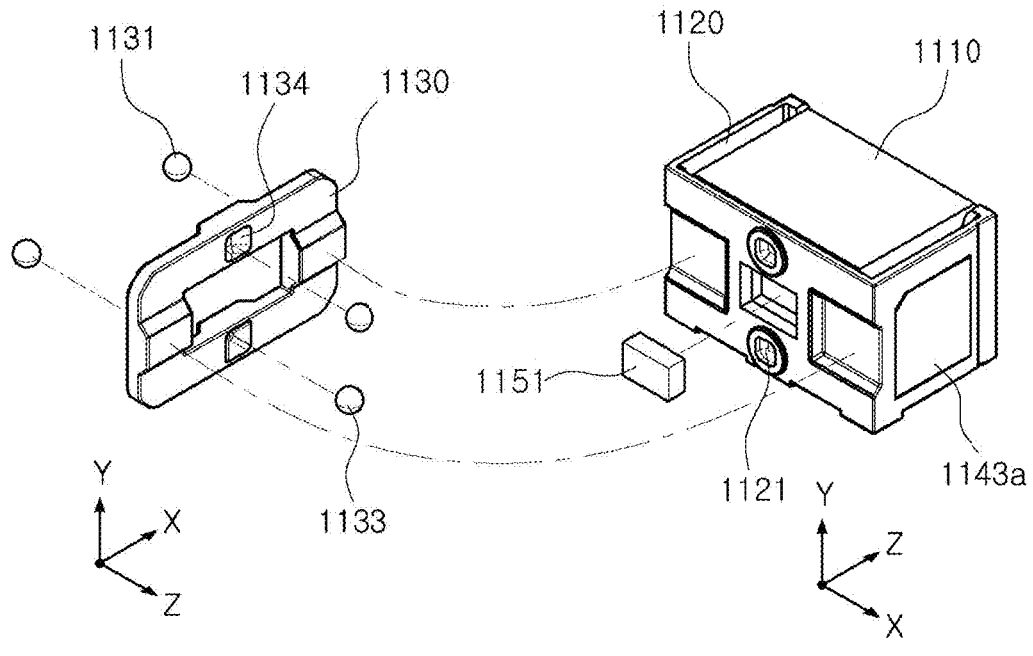
FIG. 8A is an exploded perspective view of an example of a rotation plate and a rotating holder of a camera module.
Figure 8B:
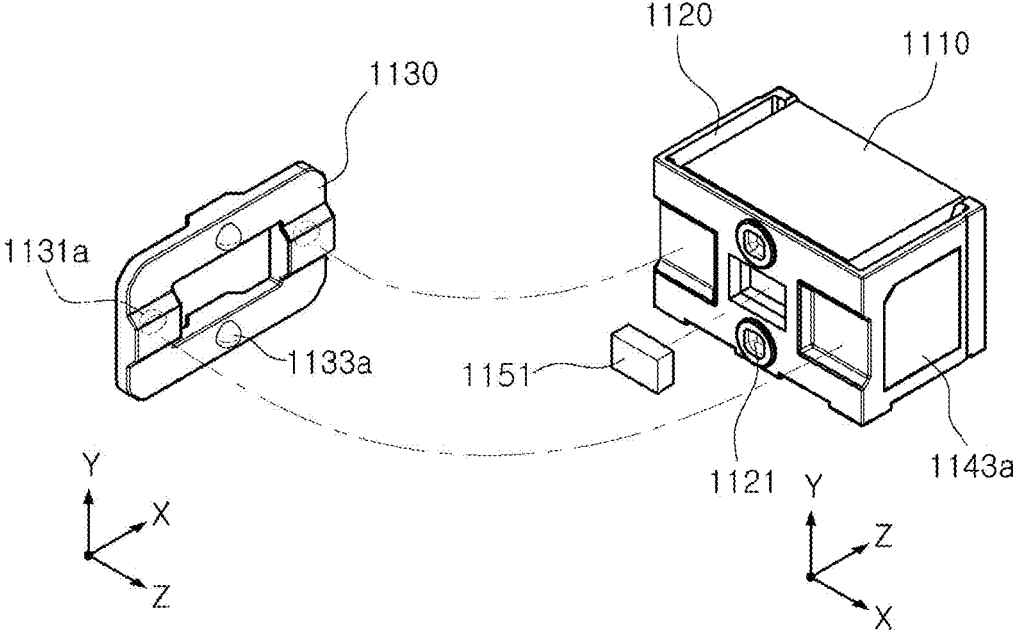
FIG. 8B is an exploded perspective view of another example of a rotation plate and a rotating holder of a camera module.
Figure 9A:
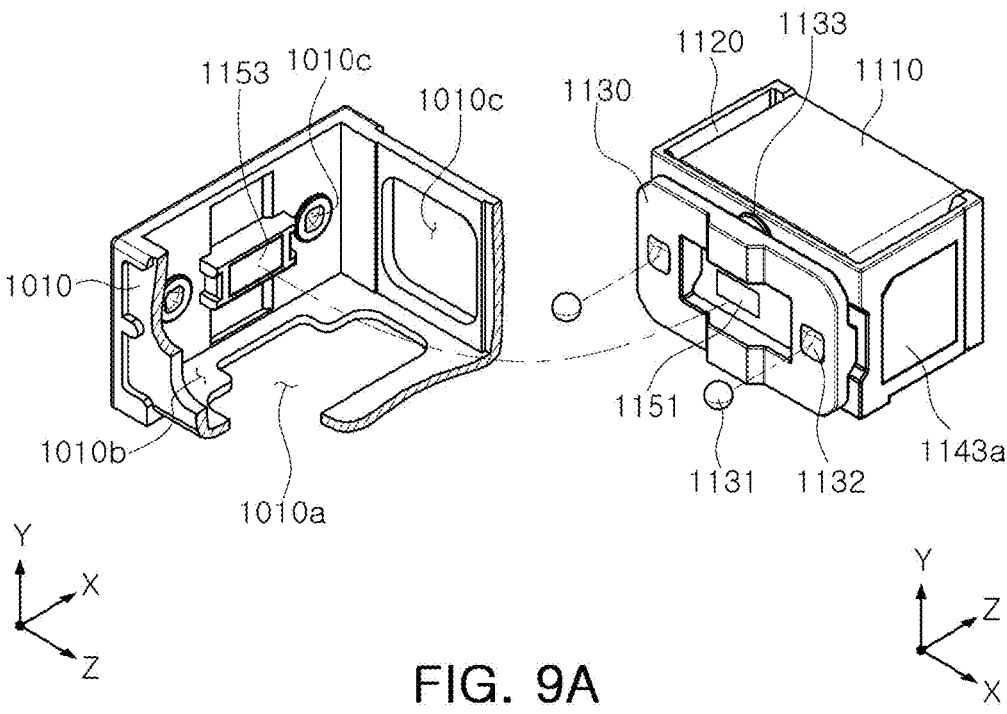
FIG. 9A is an exploded perspective view of an example of a housing, a rotation plate, and a rotating holder of a camera module.
Figure 9B:
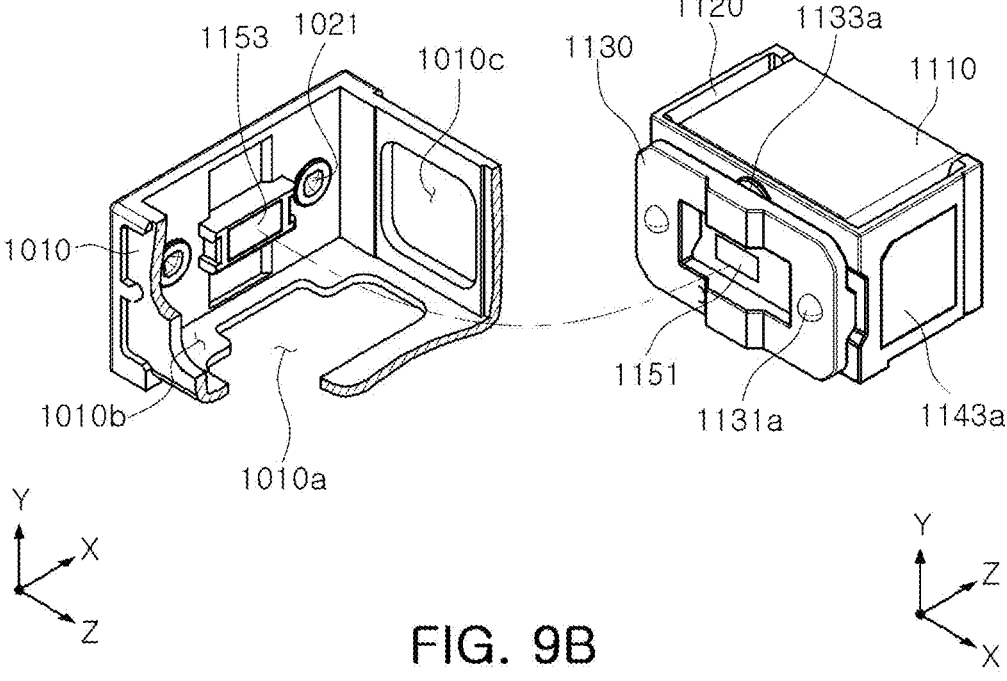
FIG. 9B is an exploded perspective view of another example of a housing, a rotation plate, and a rotating holder of a camera module.
Figure 10:
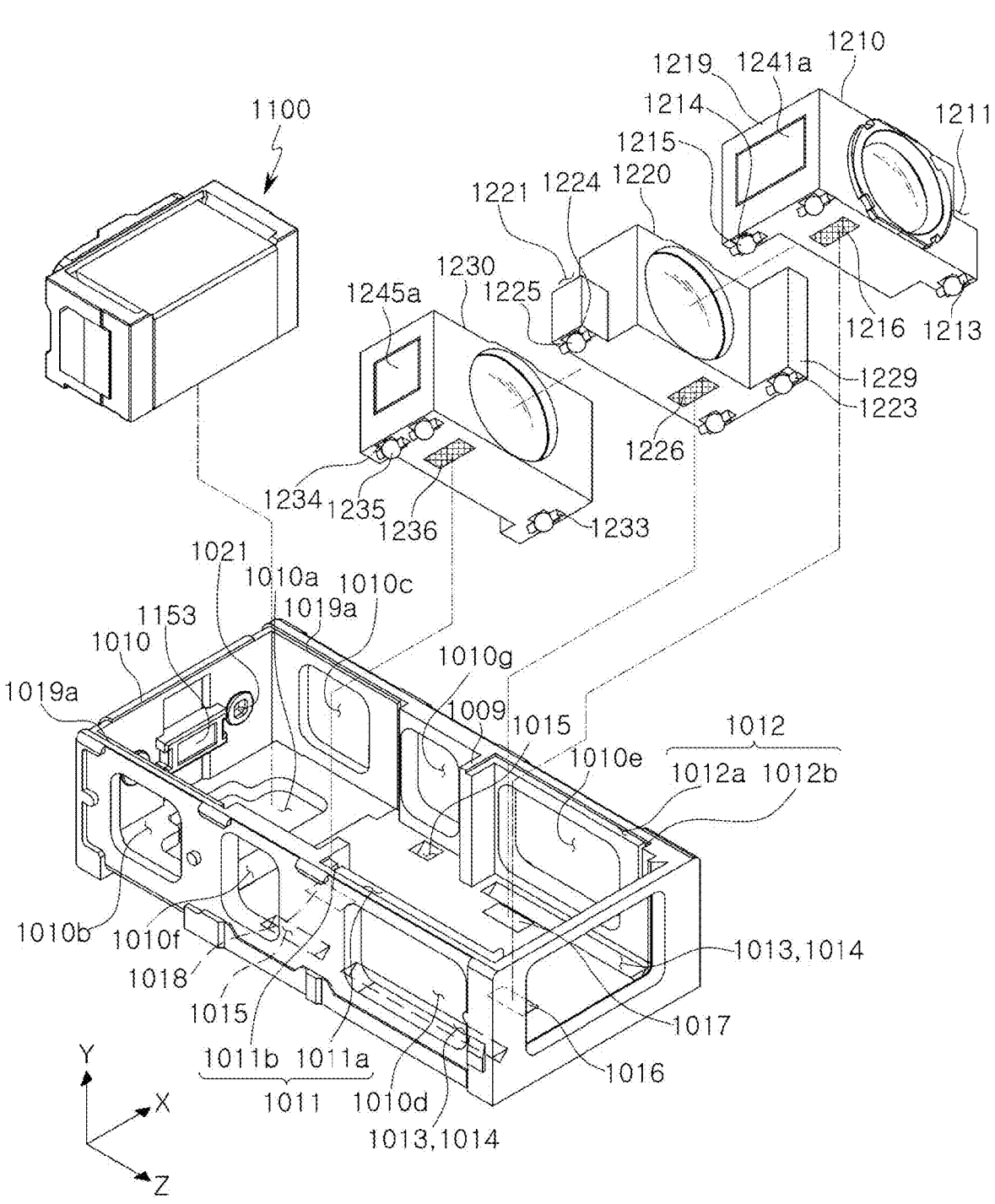
FIG. 10 is an exploded perspective view of an example of a housing, a reflection module, and three lens barrels of a camera module.

Alternatively, as illustrated in FIGS. 8B and 9B, the first guide grooves 1132 and the second guide grooves 1134 may be omitted from the front surface and the rear surface of the rotation plate 1130, respectively, and first ball bearings 1131*a* and second ball bearings 1133*a* each having a hemispherical shape may be fixed to the front surface and the rear surface of the rotation plate 1130, respectively.

However, the first ball bearings 1131*a* and the second ball bearings 1133*a* are not limited to the structure illustrated in FIGS. 8B and 9B, but may have a structure in which they may be fixed to at least one of the housing 1010, the rotation plate 1130, and the rotating holder 1120. For example, the first ball bearings 1131*a* may be fixed to the housing 1010 or to the front surface of the rotation plate 1130, and the second ball bearings 1133*a* may be fixed to the rear surface of the rotation plate 1130 or to the rotating holder 1120. In this case, only a member facing a member to which the first ball bearings 1131*a* or the second ball bearings 1133*a* are fixed may be provided with guide grooves, and the first ball bearings 1131*a* or the second ball bearings 1133*a* may serve as friction bearings by sliding rather than rotating.

Furthermore, the first ball bearings 1131*a* and the second ball bearings 1133*a* may be separately manufactured and then attached to any one of the housing 1010, the rotation plate 1130, and the rotating holder 1120. Alternatively, the first ball bearings 1131*a* and the second ball bearings 1133*a* may be provided integrally with the housing 1010, the rotation plate 1130, or the rotating holder 1120 at the time of manufacturing the housing 1010, the rotation plate 1130, or the rotating holder 1120.

The first driving portion 1140 generates a driving force capable of rotating the rotating holder 1120 around the first axis (the X-axis) and the second axis (the Y-axis).

As an example, the first driving portion 1140 may include a plurality of magnets 1141*a*, 1143*a*, and 1145*a*, and a plurality of coils 1141*b*, 1143*b*, and 1145*b* arranged to face the plurality of magnets 1141*a*, 1143*a*, and 1145*a*, respectively.

When power is applied to the plurality of coils 1141*b*, 1143*b*, and 1145*b*, the rotating holder 1120 on which the magnets 1141*a*, 1143*a*, and 1145*a* may be mounted may be rotated around the first axis (the X-axis) and the second axis (the Y-axis) by an electromagnetic interaction between the plurality of magnets 1141*a*, 1143*a*, and 1145*a* and the plurality of coils 1141*b*, 1143*b*, and 1145*b*.

The plurality of magnets 1141*a*, 1143*a*, and 1145*a* may be mounted on the rotating holder 1120. As an example, the magnet 1141*a* may be mounted on a lower surface of the rotating holder 1120, and the magnets 1143*a* and 1145*a* may be mounted on side surfaces of the rotating holder 1120.

The plurality of coils 1141*b*, 1143*b*, and 1145*b* may be mounted on the housing 1010. As an example, the plurality of coils 1141*b*, 1143*b*, and 1145*b* may be mounted on the housing 1010 through the main board 1070. That is, the plurality of coils 1141*b*, 1143*b*, and 1145*b* may be mounted on the main board 1070, while the main board 1070 may be mounted on the housing 1010.

In the drawings, an example in which the main board 1070 is a single board so that both the coils for the reflection module 1100 and the coils for the lens module 1200 may be mounted thereon is illustrated. However, the main board 1070 may be provided as at least two separate boards on which the coils for the reflection module 1100 and the coils for the lens module 1200 may be mounted, respectively.

A closed loop control method involving sensing a position of the rotating holder 1120 and providing feedback may be used when rotating the rotating holder 1120.

Therefore, position sensors 1141*c* and 1143*c* may be provided for the closed loop control. The position sensors 1141*c* and 1143*c* may be Hall sensors.

The position sensors 1141*c* and 1143*c* may be disposed inside or outside the coils 1141*b* and 1143*b*, respectively, and may be mounted on the main board 1070 on which the coils 1141*b* and 1143*b* are mounted.

The main board 1070 may be provided with a gyro sensor (not illustrated) sensing a shaking such as a hand-shake or other movement of the user, and may be provided with a driver integrated circuit (IC) (not illustrated) providing a driving signal to the plurality of coils 1141*b*, 1143*b*, and 1145*b*.

When the rotating holder 1120 rotates around the first axis (the X-axis), the rotation plate 1130 may rotate around the first ball bearings 1131 aligned along the first axis (the X-axis), which makes the rotating holder 1120 rotate as well. In this case, the rotating holder 1120 may not move relative to the rotation plate 1130.

Furthermore, when the rotating holder 1120 rotates around the second axis (the Y-axis), the rotating holder 1120 rotates around the second ball bearings 1133 aligned along the second axis (the Y-axis) along the second axis (the Y-axis). In this case, the rotation plate 1130 may not rotate, and the rotating holder 1120 may thus rotate relative to the rotation plate 1130.

For example, when the rotating holder 1120 rotates around the first axis (the X-axis), the first ball bearings 1131 may operate, and when the rotating holder 1120 rotates around the second axis (the Y-axis), the second ball bearings 1133 may operate. This is because, as illustrated in the drawings, the second ball bearings 1133 aligned along the second axis (the Y-axis) and inserted into the guide grooves 1134 cannot move when the rotating holder 1120 rotates around the first axis (the X-axis), and the first ball bearings 1131 aligned along the first axis (the X-axis) and inserted into the guide grooves 1132 cannot move when the rotating holder 1120 rotates around the second axis (the Y-axis).

The light reflected by the reflection module 1100 is incident on the lens module 1200. Therefore, optical axes of the stacked lenses provided in the lens module 1200 may be aligned in the Z-axis direction, which is a direction in which the reflected light is emitted from the reflection module 1100.

Figure 6A:
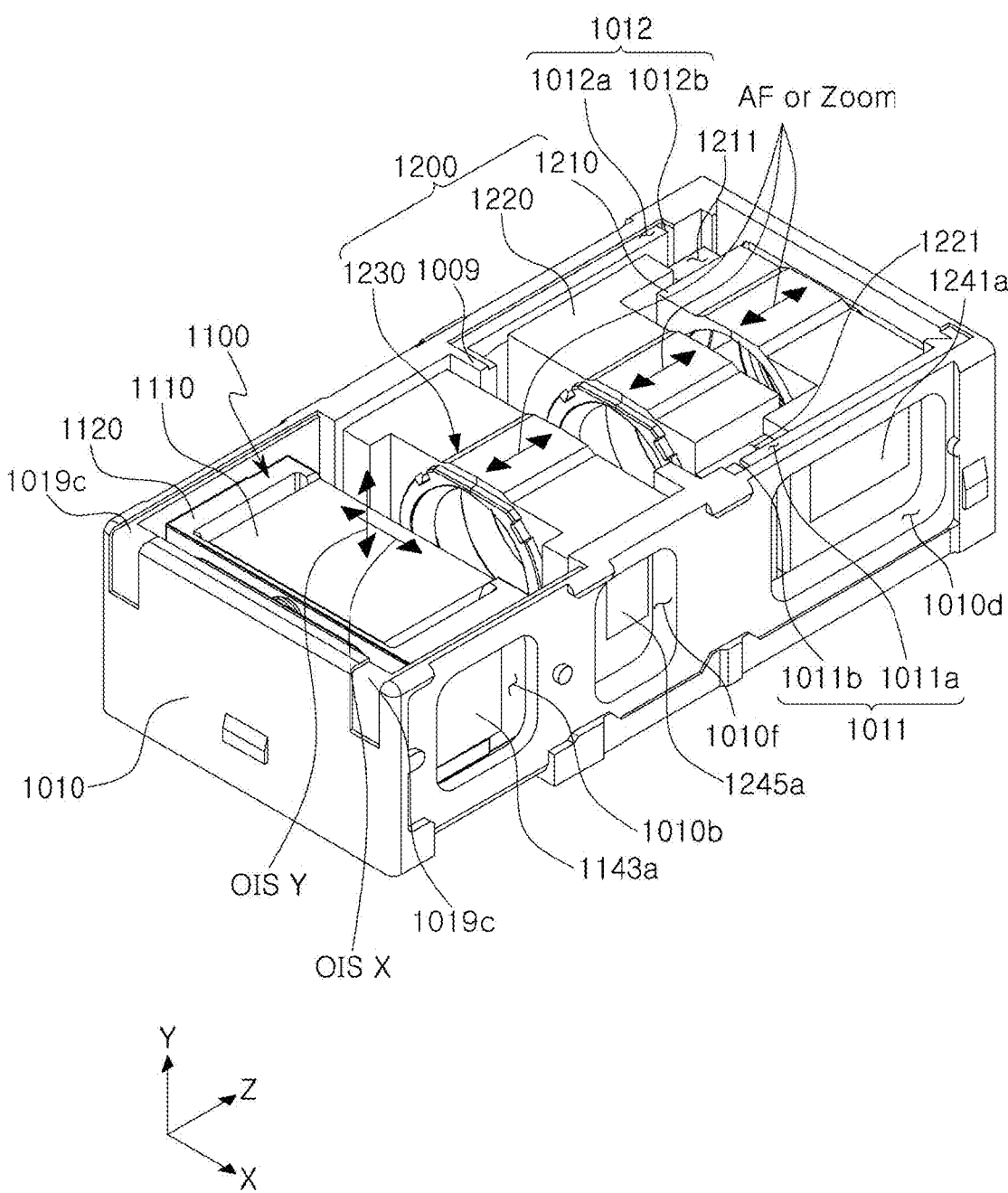
FIG. 6A is a perspective view of an example of a reflection module and a lens module coupled to a housing of a camera module.
Figure 6B:
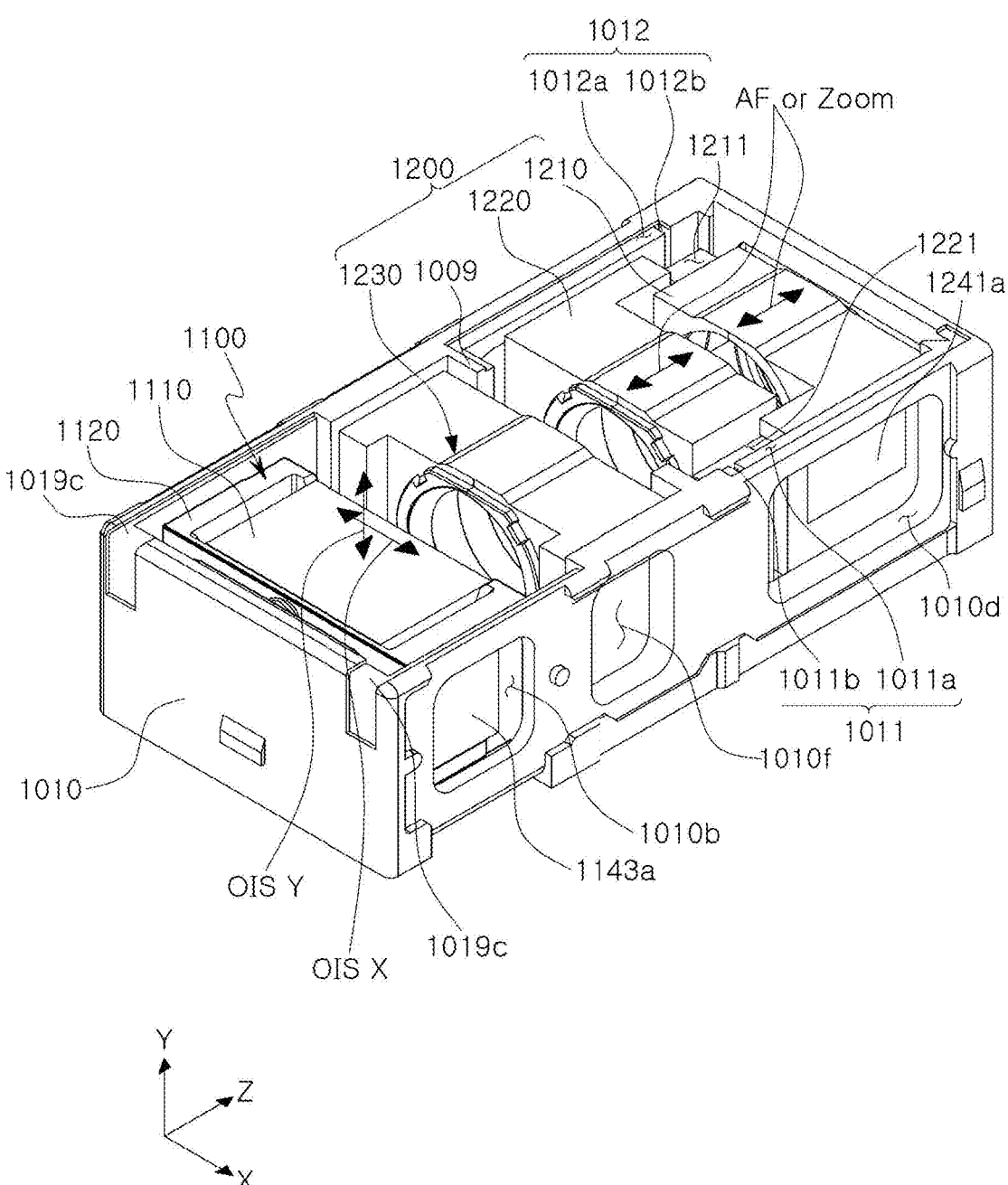
FIG. 6B is a perspective view of another example of a reflection module and a lens module coupled to a housing of a camera module.
Figure 7:
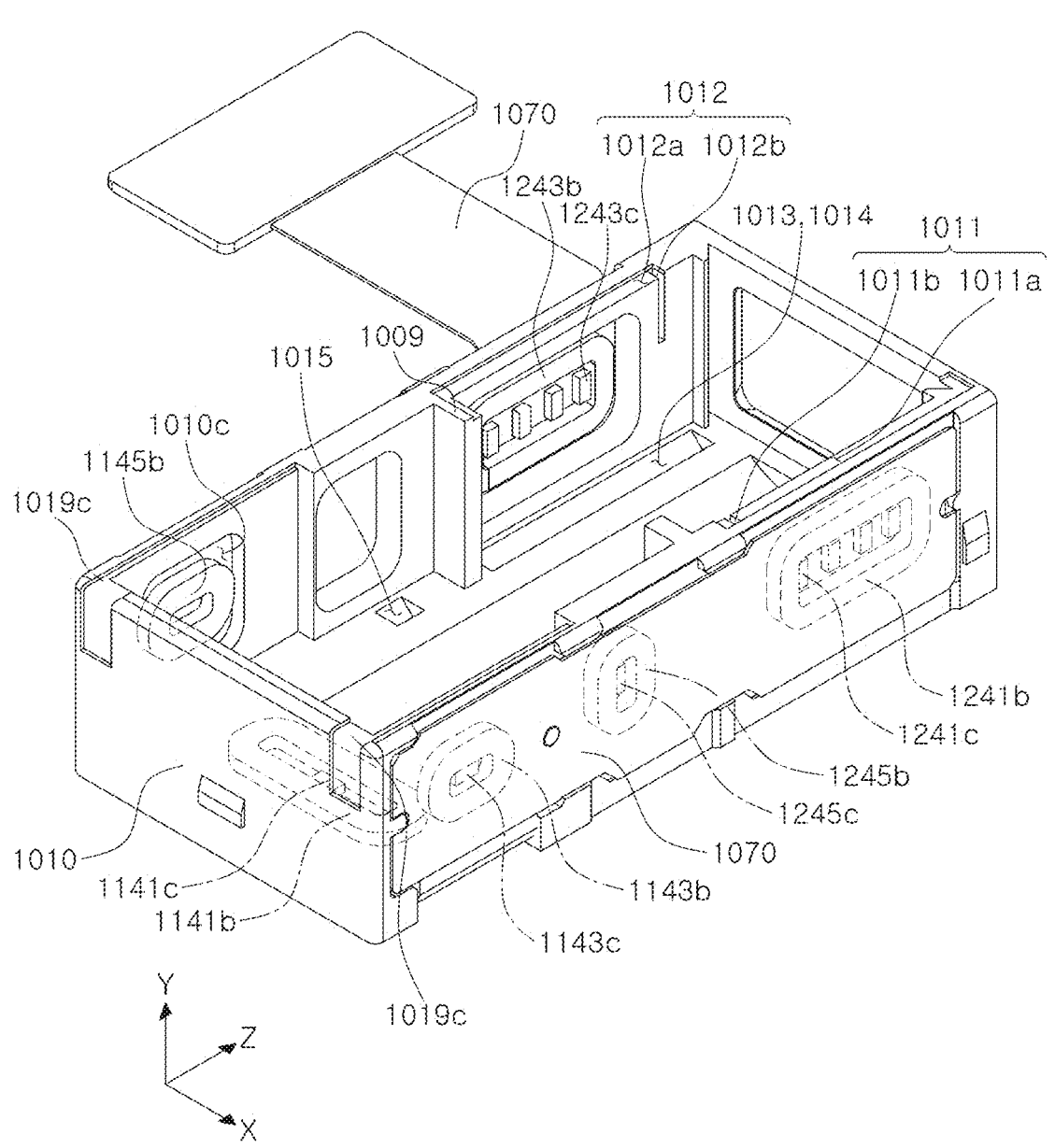
FIG. 7 is a perspective view of an example of a board having driving coils and sensors mounted thereon coupled to a housing of a camera module.

Referring to FIG. 6A, the two lens barrels 1210 and 1220 at the rear of the lens module 1200 may be responsible for the zoom function, and the lens barrel 1230 at the front of the lens module 1200 may be responsible for the AF function. Furthermore, the three lens barrels 1210, 1220, and 1230 may perform the zoom and AF functions in various combinations.

Alternatively, referring to FIG. 6B, for example, the rear two lens barrels 1210 and 1220, individually or in common, perform the zoom and AF functions, where, for example, the two lens barrels 1210 and 1220 combine to perform the zoom function, and the rearmost lens barrel 1210 may be further responsible for the AF function, and the front lens barrel 1230 may remain fixed to the housing 1010. Furthermore, although not illustrated in the drawings, any one of the three lens barrels 1210, 1220, and 1230 may remain fixed to the housing 1010 while the remaining two lens barrels may be responsible for the zoom and AF functions, individually or in common. In this case, the lens barrel (for example, lens barrel 1230) fixed to the housing 1010 does not require ball bearings or other bearings disposed between the fixed lens barrel and the housing 1010.

In addition, the housing 1010 may be configured so that a space in which the one front lens barrel 1230 and the two rear lens barrels 1210 and 1220 may be partitioned by the protruding walls 1009, but is not limited to such a configuration. The three lens barrels 1210, 1220, and 1230 may be provided in a same space or in separate spaces.

The stacked lenses provided in the lens module 1200 may be divided into at least three lens barrels 1210, 1220, and 1230, respectively. Even when the stacked lenses are divided and provided in at least three lens barrels 1210, 1220, and 1230, the optical axes of the stacked lenses may be aligned in the Z-axis direction, which is a direction in which light may be emitted from the reflection module 1100.

The lens module 1220 may include the second driving portion 1240 to implement the AF and zoom functions.

The lens modules 1220 may include at least three lens barrels, i.e., the first lens barrel 1210, the second lens barrel 1220, and the third lens barrel 1230, disposed in the internal space of the housing 1010, and may include the second driving portion 1240 moving the three lens barrels 1210, 1220, and 1230 in the optical axis (the Z-axis) direction with respect to the housing 1010.

The first to third lens barrels 1210, 1220, and 1230 may be configured to move approximately in the optical axis (the Z-axis) direction for the AF and zoom functions.

In this regard, the second driving portion 1240 generates driving forces to move the first to third lens barrels 1210, 1220, and 1230 in the optical axis (the Z-axis) direction. For example, the second driving portion 1240 enables the implementation of the AF and zoom functions by moving the first to third lens barrels 1210, 1220, and 1230 individually in the optical axis (the Z-axis) direction.

The first to third lens modules 1210, 1220, and 1230 may be configured to be supported on the bottom surface of the housing 1010. For example, the first to third lens barrels 1210, 1220, and 1230 may be individually supported by ball bearings on the bottom surface of the housing 1010. Hereinafter, an example in which the first to third lens barrels 1210, 1220, and 1230 may be individually supported by ball bearings on the bottom surface of the housing 1010 will be described.

As an example, the second driving portion 1240 may include a plurality of magnets 1241a, 1243a, and 1245a, and a plurality of coils 1241b, 1243b, and 1245b disposed to face the magnets 1241a, 1243a, and 1245a, respectively.

When power is applied to the coils 1241b, 1243b, and 1245b, the first to third lens barrels 1210, 1220, and 1230 on which the magnets 1241a, 1243a, and 1245a may be separately mounted may be moved in the optical axis (the Z-axis) direction by an electromagnetic interaction between the magnets 1241a, 1243a, and 1245a and the coils 1241b, 1243b, and 1245b.

The plurality of magnets 1241a, 1243a, and 1245a may be separately mounted on the first to third lens barrels 1210, 1220, and 1230. As an example, the first magnet 1241a may be mounted on a side surface of the first lens barrel 1210, the second magnet 1243a may be mounted on a side surface of the second lens barrel 1220, and the third magnet 1245a may be mounted on a side surface of the third lens barrel 1230.

The plurality of coils 1241b, 1243b, and 1245b may be mounted on side walls of the housing 1010 to face the plurality of magnets 1241a, 1243a, and 1245a, respectively. The plurality of magnets 1241a, 1243a, and 1245a may be provided on both side surfaces of the first to third lens barrels 1210, 1220, and 1230, and the plurality of coils 1241b, 1243b, and 1245b may be provided on both side walls of the housing 1010 to face each other.

As an example, the main board 1070 may be mounted on the housing 1010, while having the plurality of coils 1241b, 1243b, and 1245b mounted thereon.

A closed loop control method involving sensing positions of the first to third lens barrels 1210, 1220, and 1230 and providing feedback may be used when moving the first to third lens barrels 1210, 1220, and 1230. Therefore, position sensors 1241c, 1243c, and 1245c may be provided for the closed loop control. The position sensors 1241c, 1243c, and 1245c may be Hall sensors.

The position sensors 1241c, 1243c, and 1245c may be disposed inside or outside of the coils 1241b, 1243b, and 1245b, respectively, and may be mounted on the main board 1070 on which each of the coils 1241b, 1243b, and 1245b may be mounted.

In the drawings, the first lens barrel 1210 and the second lens barrel 1220 each may be driven by a coil and a magnet. In this case, a and a magnet may be provided on only one side of each of the first lens barrel 1210 and the second lens barrel 1220. The coil and the magnet may have somewhat increased sizes to enhance the driving force. In such a case, a plurality of position sensors 1241c and 1243c may be provided for accurate position sensing. In the drawings, four position sensors 1241c and 1243c may be provided inside each of the coils 1241b and 1243b driving the first lens barrel 1210 and the second lens barrel 1220. This is because the first lens barrel 1210 and the second lens barrel 1220 may be moved a considerable distance in the optical axis (the Z-axis) direction to implement a zoom function, so that a sufficient number of Hall sensors to sense the correct position should be provided.

The first lens barrel 1210 may be disposed in the housing 1010 to be movable in the optical axis (the Z-axis) direction.

A plurality of third ball bearings 1215 may be disposed between the first lens barrel 1210 and the bottom surface of the housing 1010, and the first lens barrel 1210 may move with respect to the housing 1010 on the third ball bearings 1215.

The plurality of third ball bearings 1215 serve as bearings guiding movement of the first lens barrel 1210 in a process of implementing the AF and zoom functions.

The plurality of third ball bearings 1215 may be configured to roll or slide in the optical axis (the Z-axis) direction when a driving force moving the first lens barrel 1210 in the optical axis (the Z-axis) direction is generated. Therefore, the plurality of third ball bearings 1215 guide the movement of the first lens barrel 1210 in the optical axis (the Z-axis) direction.

A plurality of guide grooves 1214 and 1013 accommodating the third ball bearings 1215 therein may be formed in a lower surface of the first lens barrel 1210 and the bottom surface of the housing 1010, respectively, and the guide grooves 1013 may be elongated in the optical axis (the Z-axis) direction.

The plurality of third ball bearings 1215 may be accommodated in the guide grooves 2014 and 1013, and may be inserted between the first lens barrel 1210 and the housing 1010.

The guide grooves 2014 may be elongated in the optical axis (the Z-axis) direction. Furthermore, cross sections of the guide grooves 2014 and 1013 may have any of various shapes, such as a rounded shape or a polygonal shape.

The first lens barrel 1210 may be pressed toward the bottom surface of the housing 1010 so that the plurality of third ball bearings 1215 may remain in contact with the first lens barrel 1210 and the housing 1010. To this end, a pulling yoke 1016 may be mounted on the bottom surface of the housing 1010 to face a pulling magnet 1216 mounted on the lower surface of the first lens barrel 1210. The pulling yoke 1016 may be made of a magnetic material. Alternatively, a pulling magnet may be mounted on a bottom surface of the housing 1010, and a pulling yoke may be mounted on a lower surface of the first lens barrel 1210.

The coil 1241*b* driving the first lens barrel 1210 may be provided on one side surface of the housing 1010. In this case, the electromagnetic force acts on one side surface of the first lens barrel 1210, and thus the pulling magnet 1216 and the pulling yoke 1016 may be biased toward the one side surface of the housing 1010 from the center of the housing 1010 to facilitate the driving of the first lens barrel 1210. The first lens barrel 1210 may be provided with an extension portion 1219 extending in the optical axis direction to oppose a side surface of the second lens barrel 1220 to increase the size of the magnet 1241*a* to enhance the driving force. Furthermore, to increase the size of the magnet 1243*a* for enhanced driving force, the second lens barrel 1220 may be provided with an extension portion 1229 extending in the optical axis direction to oppose a side surface of the first lens barrel 1210.

The coil 1243*b* driving the second lens barrel 1220 may be provided on the other side surface of the housing 1010, which may be an opposite side surface of the housing 1010 relative to the one side surface of the housing 1010 on which the coil 1241*b* may be provided. In this case, the electromagnetic force acts on the other side surface of the second lens barrel 1220, a pulling magnet 1226 mounted on the lower surface of the second lens barrel 1220 and a pulling yoke 1017 mounted on the bottom surface of the housing 1010 may be biased toward the other side surface of the housing 1010 from the center of the housing 1010 to facilitate the driving of the second lens barrel 1220.

Furthermore, the coil 1245*b* driving the third lens barrel 1230 may be provided on both side surfaces or one side surface of the housing 1010. When the coil 1245*b* is provided on only one side surface of the housing 1010, a pulling magnet 1236 mounted on the lower surface of the third lens barrel 1230 and a pulling yoke 1018 mounted on the bottom surface of the housing 1010 may be biased toward one side surface of the housing 1010 from the center of the housing 1010 to facilitate the driving of the third lens barrel 1230, similarly to the first and second lens barrels 1210 and 1220. However, this is only applicable to a case in which the coils 1241*b*, 1243*b*, and 1245*b* driving the lens barrels 1210, 1220, and 1230 may be provided on only one of the one side surface of the housing 101 and the other side surface of the housing 1010. When the coils 1241*b*, 1243*b*, and 1245*b* are provided on both side surfaces of the housing 1010, the pulling magnets 1216, 1226, and 1236 may be mounted approximately in the center of the lower surfaces of the lens barrels 1210, 1220, and 1230, and the pulling yokes 1016, 1017, and 1018 may be mounted approximately in the center of the bottom surface of the housing 1010.

The second lens barrel 1220 may be disposed in the housing 1010 to be movable in the optical axis (the Z-axis) direction. As an example, the second lens barrel 1220 may be disposed in series with the first lens barrel 1210 in the optical axis direction in front of the first lens barrel 1210.

A plurality of fourth ball bearings 1225 may be disposed between the second lens barrel 1220 and the bottom surface of the housing 1010, and the second lens barrel 1220 may move with respect to the housing 1010 on the fourth ball bearings 1225.

The plurality of fourth ball bearings 1225 serve as bearings guiding movement of the second lens barrel 1220 in a process of implementing the AF and zoom functions.

The plurality of fourth ball bearings 1225 may be configured to roll or slide in the optical axis direction (the Z-axis direction) when a driving force moving the second lens barrel 1220 in the optical axis (the Z-axis) direction is generated. Therefore, the plurality of fourth ball bearings 1225 guide the movement of the second lens barrel 1220 in the optical axis (the Z-axis) direction.

A plurality of guide grooves 1224 and 1014 accommodating the fourth ball bearings 1225 therein may be formed in a lower surface of the second lens barrel 1220 and the bottom surface of the housing 1010, respectively, and the guide grooves 1014 may be elongated in the optical axis (the Z-axis) direction.

The plurality of fourth ball bearings 1225 may be accommodated in the guide grooves 1224 and 1014, and may be inserted between the second lens barrel 1220 and the housing 1010.

Each of the plurality of guide grooves 1014 may be elongated in the optical axis (the Z-axis) direction. Furthermore, cross sections of the guide grooves 1224 and 1014 have any of various shapes, such as a rounded shape or a polygonal shape.

The second lens barrel 1220 may be pressed toward the bottom surface of the housing 1010 so that the fourth ball bearings 1225 may remain in contact with the second lens barrel 1220 and the housing 1010.

To this end, the pulling yoke 1017 may be mounted on the bottom surface of the housing 1010 to face the pulling magnet 1226 mounted on the lower surface of the second lens barrel 1220. The pulling yoke 1017 may be made of a magnetic material. Alternatively, a pulling magnet may be mounted on the bottom surface of the housing 1010, and a pulling yoke may be mounted on the lower surface of the second lens barrel 1220.

The third lens barrel 1230 may be disposed in the housing 1010 to be movable in the optical axis (the Z-axis) direction. As an example, the third lens barrel 1230 may be disposed in series with the second lens barrel 1220 in the optical axis direction in front of the second lens barrel 1220.

A plurality of fifth ball bearings 1235 may be disposed between the third lens barrel 1230 and the bottom surface of the housing 1010, and the third lens barrel 1230 may move with respect to the housing 1010 on the fifth ball bearings 1235.

The plurality of fifth ball bearings 1235 serve as bearings guiding movement of the third lens barrel 1230 in a process of implementing the AF and zoom functions.

The plurality of fifth ball bearings 1235 may be configured to roll or slide in the optical axis direction (the Z-axis direction) when a driving force moving the third lens barrel 1230 in the optical axis (the Z-axis) direction is generated. Therefore, the plurality of fifth ball bearings 1235 guide the movement of the third lens barrel 1230 in the optical axis (the Z-axis) direction.

A plurality of guide grooves 1234 and 1015 accommodating the fifth ball bearings 1235 therein may be formed in a lower surface of the third lens barrel 1230 and the bottom surface of the housing 1010, respectively, and the guide grooves 1015 may be elongated in the optical axis (the Z-axis) direction.

The plurality of fifth ball bearings 1235 may be accommodated in the guide grooves 1234 and 1015, and may be inserted between the third lens barrel 1230 and the housing 1010.

Each of the plurality of guide grooves 1015 may be elongated in the optical axis (the Z-axis) direction. Furthermore, cross sections of the guide grooves 1234 and 1015 may have various shapes, such as a rounded shape or a polygonal shape.

The third lens barrel 1230 may be pressed toward the bottom surface of the housing 1010 so that the fifth ball bearings 1235 may remain in contact with the third lens barrel 1230 and the housing 1010.

To this end, the pulling yoke 1018 may be mounted on the bottom surface of the housing 1010 to face the pulling magnet 1236 mounted on the lower surface of the third lens barrel 1230. The pulling yoke 1018 may be made of a magnetic material. Alternatively, a pulling magnet may be mounted on the bottom surface of the housing 1010, and a pulling yoke may be mounted on the lower surface of the third lens barrel 1230.

Guide grooves 1013, 1014, and 1015 provided in the housing 1010 to guide the movements of the third to fifth ball bearings 1215, 1225, and 1235 each may have an elongated groove shape extending in the optical axis direction, or at least two of the guide grooves 1013, 1014, and 1015 may be connected to each other to form a single guide groove. In the case of the single guide groove in which at least two of the guide grooves 1013, 1014, and 1015 are connected to each other, at least two of the first to third lens barrels 1210, 1220, and 1230 may be easily aligned with each other in the optical axis direction.

An example in which the guide groves 1013 and 1014 provided to form moving paths of the first and second lens barrels 1210 and 1220 are connected to each other to form a single guide groove and the guide groove 1015 provided to form a moving path of the third lens barrel is provided separately is illustrated in the drawings. Alternatively, all of the guide grooves 1013, 1014, and 1015 may be connected to each other to form a single groove.

In addition, at least some of the guide grooves 1214, 1224, and 1234 of the first to third lens barrels 1210, 1220, and 1230 may protrude from the lower surfaces of the first to third lens barrels 1214, 1224, and 1234 toward the bottom surface of the housing 1010 on both sides of the optical axis to form anti-separation protrusions 1213, 1223, and 1233 to prevent separation of the ball bearings 1215, 1225, and 1235. The anti-separation protrusions 1213, 1223, and 1233 may have shapes corresponding to the shapes of the guide grooves 1013, 1014, and 1015 formed in the bottom surface of the housing 1010. The anti-separation protrusions 1213, 1223, and 1233 have a height that is large enough so that they protrude into the guide grooves 1013, 1014, and 1015, but small enough that they do not contact the bottom surfaces of the guide grooves 1013, 1014, and 1015 as the first to third lens barrels 1210, 1220, and 1230 move in the optical axis direction.

However, the anti-separation protrusions 1213, 1223, and 1233 are not limited to being provided on the lower surfaces of the first to third lens barrels 1210, 1220, and 1230, but instead may be provided on the bottom surface of the housing 1010 based on the same principle.

Figure 13A:
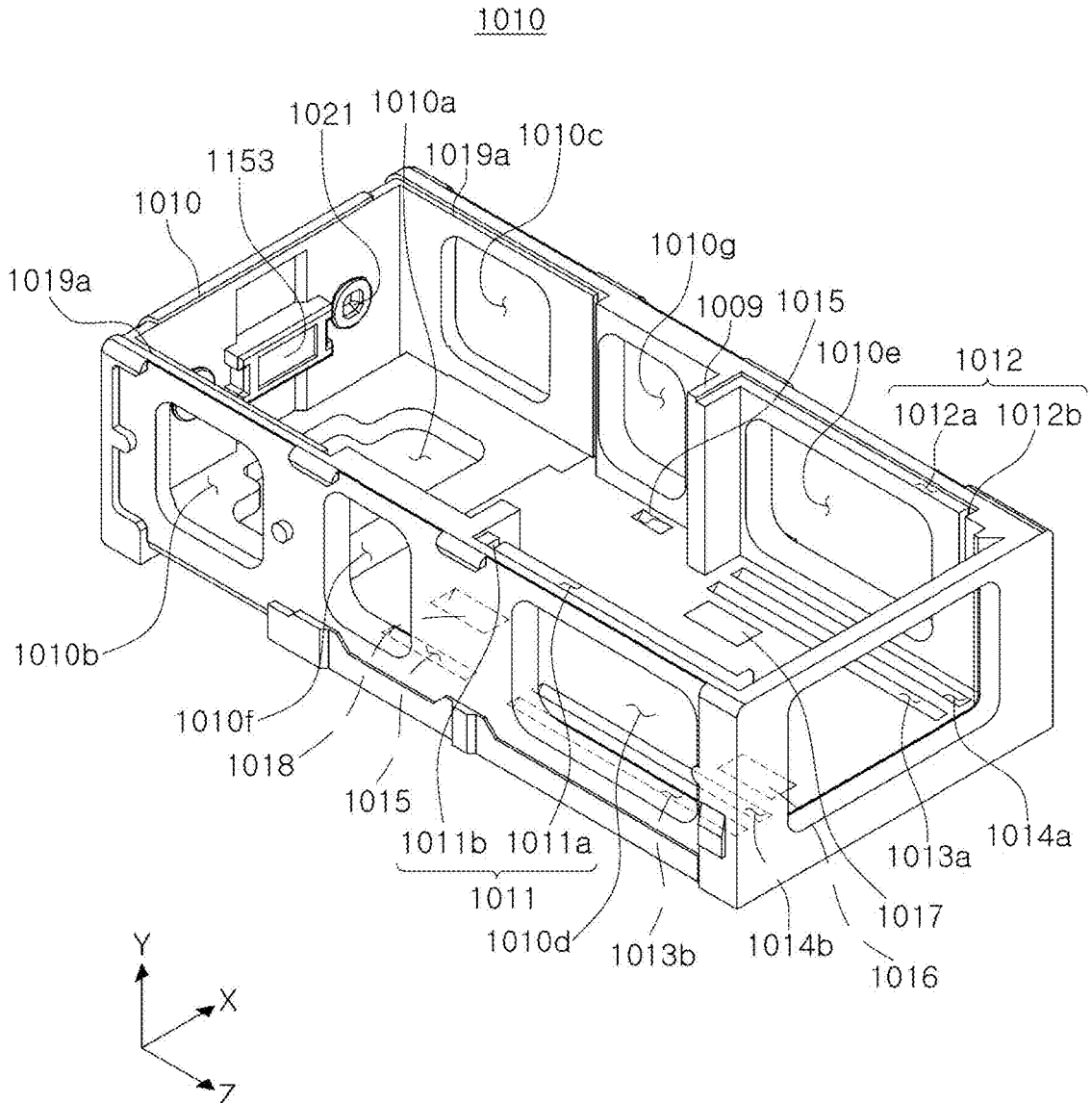
FIG. 13A is a perspective view of another example of a housing of a camera module including separate guide grooves for a first lens barrel and a second lens barrel of a zoom lens of the camera module.
Figure 13B:
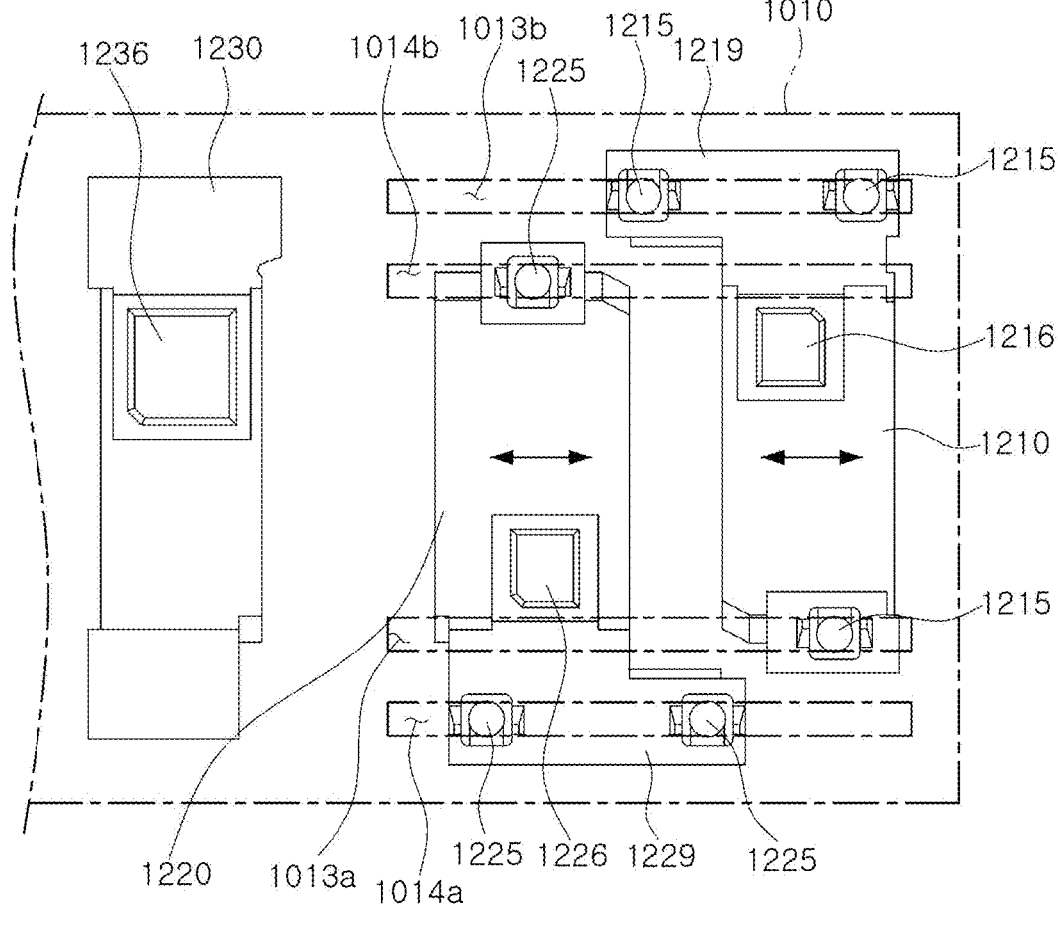
FIG. 13B is a bottom plan view of a first lens barrel and a second lens barrel of a zoom lens mounted in the separate guide grooves of the housing of a camera module of FIG. 13A.
Figure 13B:
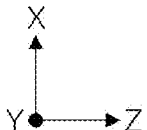

Furthermore, referring to FIG. 13A, the housing 1010 in another example may include separate guide grooves 1013*a*, 1013*b*, 1014*a*, and 1014*b* for guiding movements of the first and second lens barrels 1210 and 1220 in the optical axis direction. For example, the housing 1010 may include a total of four separate first guide grooves 1013*a* and 1013*b* and second guide grooves 1014*a* and 1014*b*, and the first lens barrel 1210 may be supported by the third ball bearings 1215 inserted into the first guide grooves 1013*a* and 1013*b*, and the second lens barrel 1220 may be supported by the fourth ball bearings 1225 inserted into the second guide grooves 1014*a* and 1014*b*.

In this case, since the first lens barrel 1210 and the second lens barrel 1220 are staggered with respect to each other in a direction perpendicular to the optical axis direction, the extension portions 1219 and 1229 of the first and second lens barrels 1210 and 1220 may move a greater distance in the optical axis direction without interference from the first and second lens barrels 1210 and 1220. Therefore, the zoom performance may be further improved.

The first to third lens barrels 1210, 1220, and 1230 in this example may be sequentially provided in the optical axis direction, and the first and second lens barrels 1210 and 1220 may be respectively provided with magnets 1241*a* and 1243*a* on one side thereof facing coils 1241*b* and 1243*b* mounted on the housing 1010. In addition, the third lens barrel 1230 may be provided with a magnet 1245*a* on one side thereof facing a coil 1245*b* mounted on the housing 1010. The magnets 1241*a*, 1243*a*, and 1245*a* provided on the first to third lens barrels 1210, 1220, and 1230 may be alternately arranged on one side of the first to third lens barrels 1210, 1220, and 1230 and the other side of the first to third lens barrels 1210, 1220, and 1230 in a zigzag manner to minimize mutual electromagnetic effects.

Since the first and second lens barrels 1210 and 1220 in this example are moved in the optical axis direction for performing the zoom and AF functions in one space partitioned by the protruding walls 1009, they may come into contact with each other. In this case, it is not possible to accurately control the positions of the first and second lens barrels in the optical axis direction.

Therefore, in this example, a stopper 1060 may be provided to limit the movements of the first and second lens barrels 1210 and 1220. The stopper 1060 may include a first stopper 1061 limiting a moving distance of the first lens barrel 1210, and a second stopper 1062 limiting a moving distance of the second lens barrel 1220. The first stopper 1061 and the second stopper 1062 may be provided separately (see FIGS. 11B and 12B), or may be interconnected (see FIGS. 11A and 12A).

The stopper 1060 may include the first stopper 1061 and the second stopper 1062. In addition, a first frame 1061*a* and a second frame 1062*a* to be described below may be integrally connected (see FIGS. 11A and 12A), or may be separately provided (see FIGS. 11B and 12B).

Figure 11A:
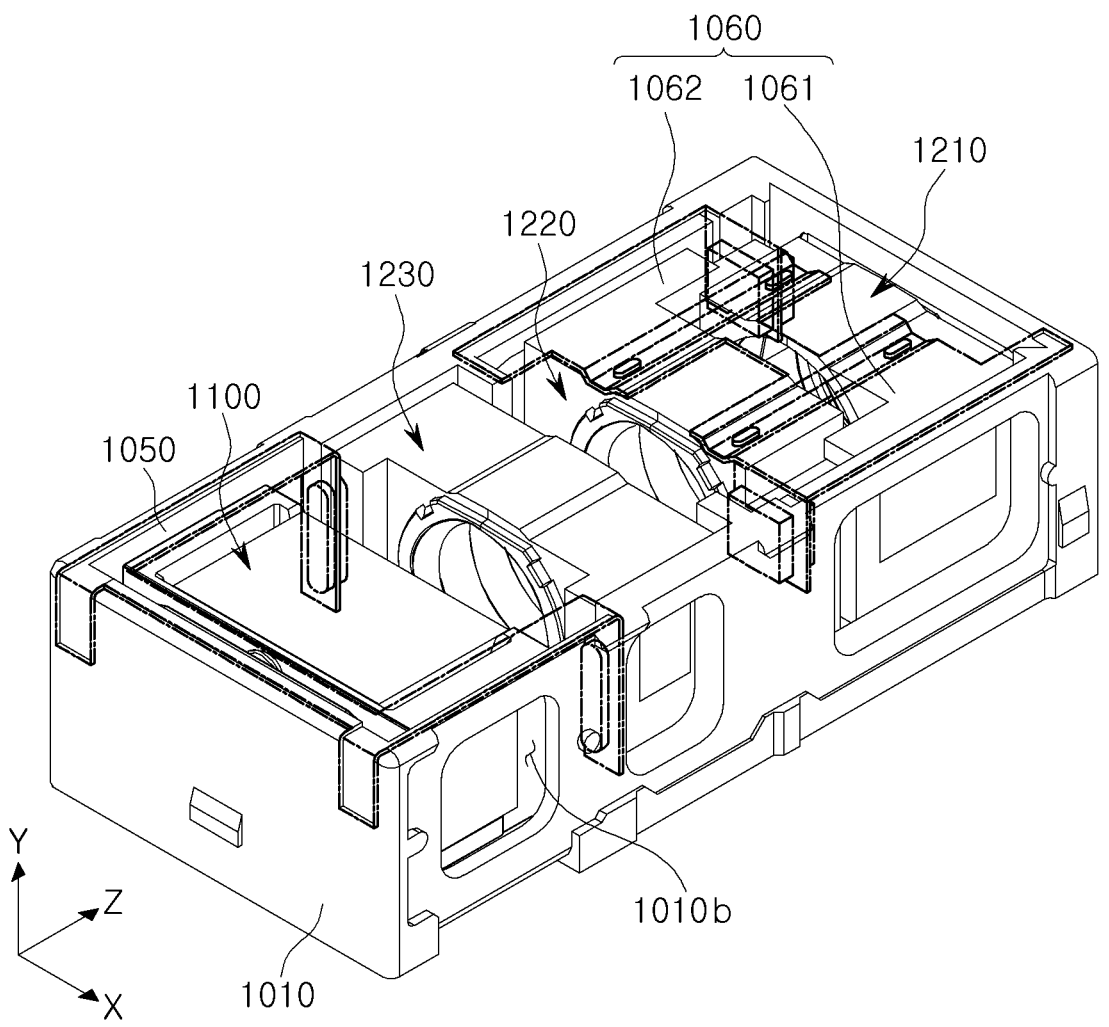
FIG. 11A is a perspective view of an example of a damper of a rotating holder and a stopper of a zoom lens of a camera module.
Figure 12A:
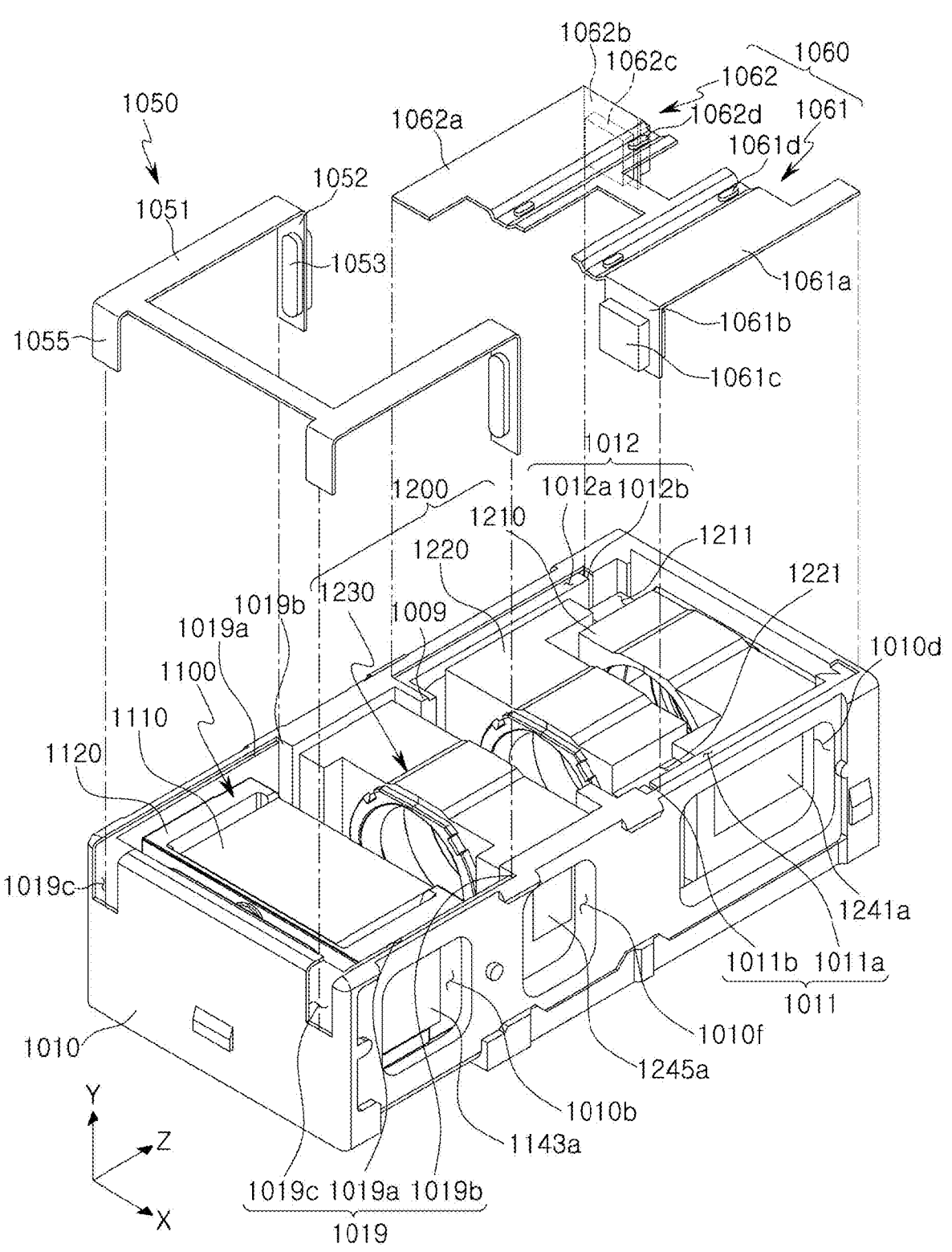
FIG. 12A is a exploded perspective view of the damper of the rotating holder and the stopper of the zoom lens of a camera module of FIG. 11A.

First, a case in which the first frame 1061*a* and the second frame 1062*a* are integrally connected to each other will be described with reference to FIGS. 11A and 12A.

When the first frame and the second frame are integrally connected to each other, the first frame 1061*a* and the second frame 1062*a* may include a third damping member 1061*d* and a fourth damping member 1062*d* facing the first and second lens barrels 1210 and 1220 to absorb impacts of the first and second lens barrels 1210 and 1220 moving upwardly.

The first stopper 1061 may include a first frame 1061*a*, a first extension portion 1061*b* extending downwardly perpendicular to the optical axis direction from a front end of the first frame 1061*a*, and a first damping member 1061*c* disposed on the first extension portion 1061*b*.

The first damping member 1061*c* may be inserted into a through-hole formed in the first extension portion 1061*b* to protrude from both sides of the first extension portion 1061*b* in the optical axis direction, or may be attached to both sides of the first extension portion 1061*b* by an adhesive.

In addition, the first frame 1061*a* may be mounted on the upper surface of the left side wall of the housing 1010 and the upper surface of the rear wall of the housing 1010 to cover the portion of the first lens barrel 1210 in which first extension portion 1219 is provided. The first extension portion 1061*b* and the first damping member 1061*c* may be inserted between the front side of the first lens barrel 1210 and the rear surface of the left protruding wall 1009.

The housing 1010 may be provided with insertion grooves 1011 into which the first frame 1061*a* and the first extension portion 1061*b* are inserted. The insertion grooves 1011 may include a first insertion groove 1011*a* extending in the optical axis direction along an inner edge of the upper surface of the left side wall of the housing 1010 and formed in an inner portion of the upper surface of the left side wall of the housing 1010 and in an inner portion of the upper surface of the rear wall of the housing 1010, and a second insertion groove 1011*b* extending downwardly perpendicular to the optical axis direction from a front end of the first insertion groove 1011*a* and formed in the inner surface of the left side wall of the housing 1010.

The first frame 1061*a* may be inserted into the first insertion groove 1011*a*, and the first extension portion 1061*b* may be inserted into the second insertion groove 1011*b*. The first frame 1061*a* may be further attached to the housing 1010 by an adhesive.

To provide a space for accommodating the first extension portion 1061*b* and the first damping member 1061*c*, a second space portion 1221 may be provided in the upper portion of the second lens barrel 1220.

Therefore, the first lens barrel 1210 may be controlled to move only between the inner surface of the rear wall of the housing 1010 and the rear surface of the first damping member 1061*c* disposed behind the rear surface of the left protruding wall 1009.

The second stopper 1062 may include a second frame 1062*a*, a second extension portion 1062*b* extending downwardly perpendicular to the optical axis direction from the rear end of the second frame 1062*a*, and a second damping member 1062*c* disposed on the second extension portion 1062*b*.

The second damping member 1062*c* may be inserted into a through-hole formed in the second extension portion 1062*b* to protrude from both sides of the second extension portion 1062*b* in the optical axis direction, or may be attached to both sides of the second extension portion 1062*b* by an adhesive.

In addition, the second frame 1062*a* may be mounted on the upper surface of the right side wall of the housing 1010 and the upper surface of the right protruding wall 1009 to cover the portion of the second lens barrel 1220 in which the second extension portion 1229 is provided. The second extension portion 1062*b* and the second damping member 1062*c* may be inserted between rear side of the second lens barrel 1220 and the inner surface of the rear wall of the housing 1010.

The housing 1010 may be provided with an insertion grooves 1012 into which the second frame 1062*a* and the second extension portion 1062*b* are inserted. The insertion grooves 1012 may include a first insertion groove 1012*a* extending in the optical axis direction along an inner edge of the upper surface of the right side wall of the housing 1010 and formed in an inner portion of the upper surface of the right side wall of the housing 1010 and in the upper surface of the right protruding wall 1009, and a second insertion groove 1012*b* extending downwardly perpendicular to the optical axis direction from the rear end of the first insertion groove 1012*a* and formed in the inner surface of the right side wall of the housing 1010.

The second frame 1062*a* may be inserted into the second insertion groove 1012*a*, and the second extension portion 1062*b* may be inserted into the second insertion groove

1012*b*. The second frame 1062*a* may be further attached to the housing 1010 by an adhesive.

To provide a space for accommodating the second extension portion 1062*b* and the second damping member 1062*c*, a first space portion 1211 may be provided in the upper portion of the first lens barrel 1210.

Therefore, the second lens barrel 1220 may be controlled to move only between the rear surface of the right protruding wall 1009 and the front surface of the second damping member 1062*c* disposed in front of the inner surface of the rear wall of the housing 1010.

Figure 11B:
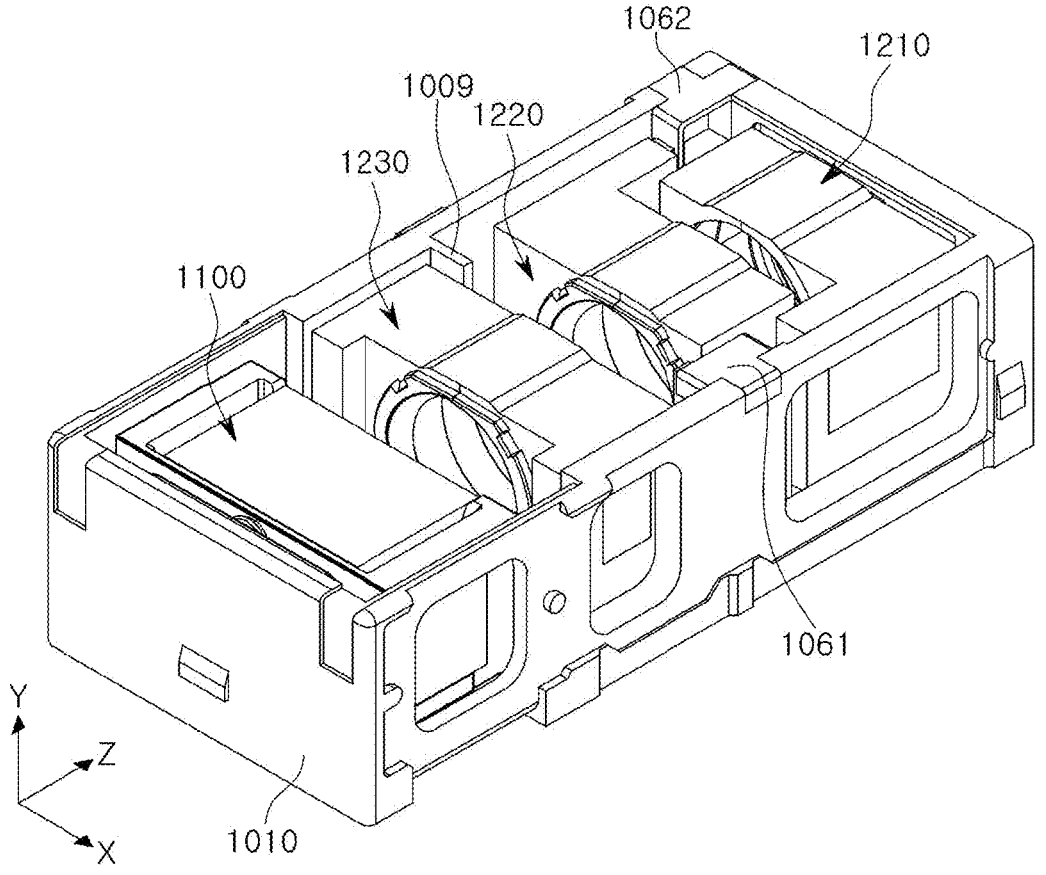
FIG. 11B is a perspective view of another example of a stopper of a zoom lens of a camera module.
Figure 12B:
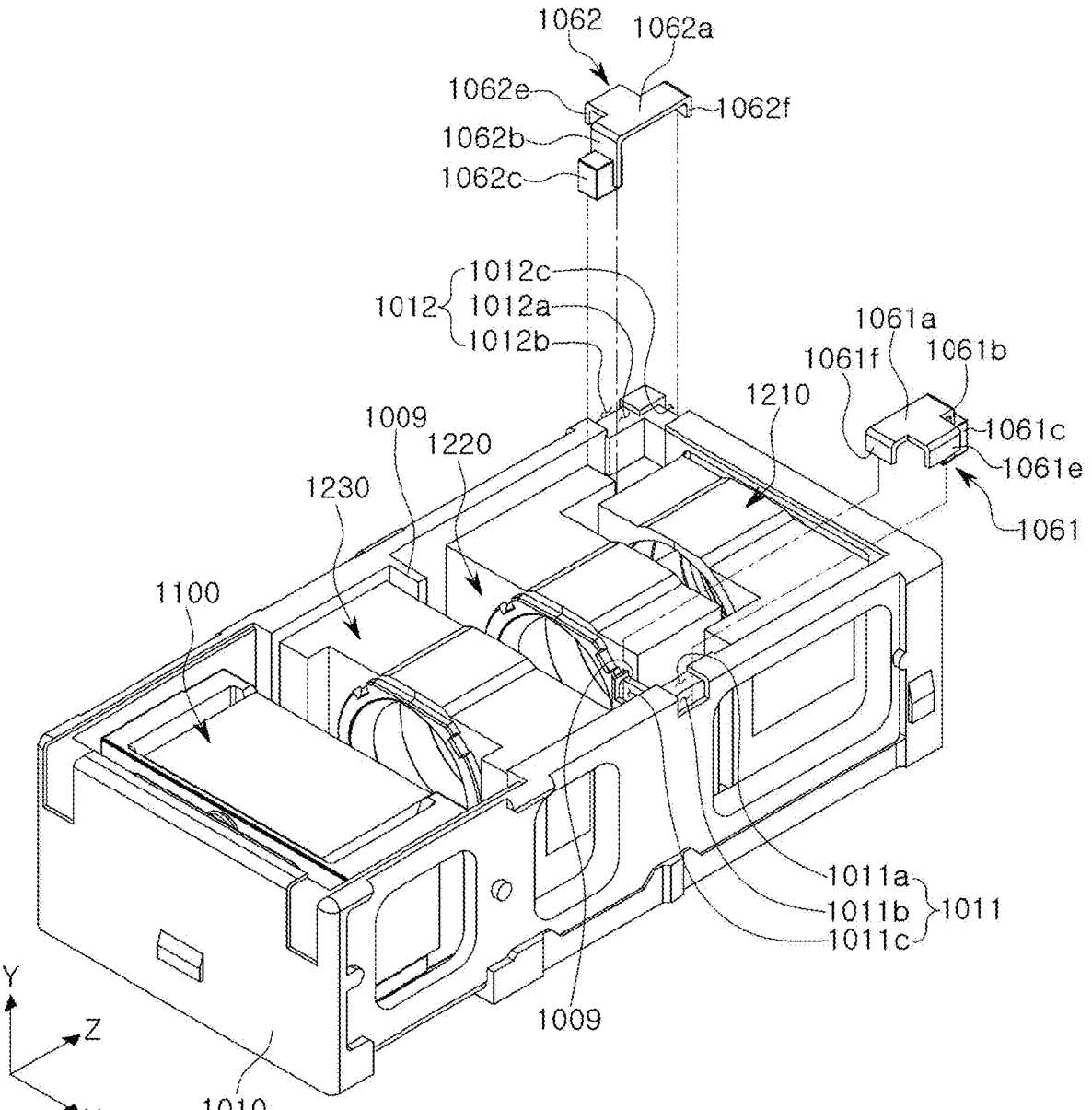
FIG. 12B is a exploded perspective view of the stopper of the zoom lens of a camera module of FIG. 11B.

Next, a case in which the first frame 1061*a* and the second frame 1062*a* are provided separately from each other will be described with reference to FIGS. 11B and 12B.

When the first frame and the second frame are provided separately, the first stopper 1061 may include a first frame 1061*a*, a first extension portion 1061*b* extending downwardly perpendicular to the optical axis direction from a rear end of the frame 1061*a*, and a first damping member 1061*c* disposed on the first extension portion 1061*b*. In addition, the first stopper 1061 may include a first side wall mounting portion 1061*e* extending downwardly perpendicular to the optical axis direction from a left side of the first frame 1061*a*, and a first protruding wall mounting portion 1061*f* extending downwardly perpendicular to the optical axis direction from a front end of the first frame 1061*a*.

The first damping member 1061*c* may be inserted into a through-hole formed in the first extension portion 1061*b* to protrude from both sides of the first extension portion 1061*b* in the optical axis direction, or may be attached to both sides of the first extension portion 1061*b* by an adhesive.

In addition, the first frame 1061*a* may be mounted on the upper surface of the left side wall of the housing 1010 and the upper surface of the left protruding wall 1009 to cover a portion of the second lens barrel 1220 in which a second space portion 1221 is provided as will be described below. The first extension portion 1061*b* and the first damping member 1061*c* may be inserted between the front side of the first lens barrel 1210 and the rear surface of the left protruding wall 1009. The first side wall mounting portion 1061*e* extending from the left side of the first frame 1061*a* may be clipped onto the left side wall of the housing 1010, and the first protruding wall mounting portion 1061*f* extending from the front end of the first frame 1061*a* may be clipped onto the protruding wall 1009, to improve a bonding force between the first stopper 1061 and the housing 1010.

The housing 1010 may be provided with an insertion grooves 1011 into which the first frame 1061*a*, the first side wall mounting portion 1061*e*, and the first protruding wall mounting portion 1061*f* are inserted. The insertion grooves 1011 may include a first insertion groove 1011*a* extending in the optical axis direction along an inner edge of the upper surface of the left side wall of the housing 1010 and formed in an inner portion of the upper surface of the left side wall of the housing 1010, a second insertion groove 1011*b* extending downwardly perpendicular to the optical axis direction from a left side of the first insertion groove 1011*a* and formed in an outer surface of the left side wall of the housing 1010, and a third insertion groove 1011*c* extending downwardly perpendicular to the optical axis direction and formed in a portion of the front surface of the left protruding wall 1009 adjacent to the inner surface of the left side wall of the housing 1010.

The first frame 1061*a* may be inserted into the first insertion groove 1011*a*, the first side wall mounting portion 1061*e* may be inserted into the second insertion groove 1011*b*, and the first protruding wall mounting portion 1061*f* may be inserted into the third insertion groove 1011*c*. The first frame 1061*a*, the first side wall mounting portion 1061*e*, and the first protruding wall mounting portion 1061*f* may be additionally attached to the housing 1010 by an adhesive.

To provide a space for accommodating the first extension portion 1061*b* and the first damping member 1061*c*, a second space portion 1221 may be provided in the upper portion of the second lens barrel 1220.

Therefore, the first lens barrel 1210 may be controlled to move only between the inner surface of the rear wall of the housing 1010 and the front surface of the first damping member 1061*c* disposed behind the rear surface of the left protruding wall 1009.

The second stopper 1062 may include a second frame 1062*a*, a second extension portion 1062*b* extending downwardly perpendicular to the optical axis direction from a front end of the second frame 1062*a*, and a second damping member 1062*c* disposed on the second extension portion 1062*b*. In addition, the second stopper 1062 may include a second side wall mounting portion 1062*e* extending downwardly perpendicular to the optical axis direction from a right side of the second frame 1062*a*, and a second rear wall mounting portion 1062*f* extending downwardly perpendicular to the optical axis direction from a rear end of the second frame 1062*a*.

The second damping member 1062*c* may be inserted into a through-hole formed in the second extension portion 1062*b* to protrude from both sides of the second extension portion 1062*b* in the optical axis direction, or may be attached to both sides of the second extension portion 1062*b* by an adhesive.

In addition, the second frame 1062*a* may be mounted on the upper surface of the right side wall of the housing 1010 and the upper surface of the rear wall of the housing 1010 to cover a portion of the first lens barrel 1210 in which a first space portion 1211 is provided as will be described below. The second extension portion 1062*b* and the second damping member 1062*c* may be inserted between the rear side of the second lens barrel 1220 and the inner surface of the rear wall of the housing 1010. The second side wall mounting portion 1062*e* extending from the right side of the second frame 1062*a* may be clipped onto the right side wall of the housing 1010, and the second rear wall mounting portion 1062*f* extending from the rear end of the second frame 1062*a* may be clipped onto the rear wall of the housing 1010, to improve a bonding force between the second stopper 1062 and the housing 1010.

The housing 1010 may be provided with insertion grooves 1012 into which the second frame 1062*a*, the second side wall mounting portion 1062*e*, and the second rear wall mounting portion 1062*f* are inserted. The insertion grooves 1012 may include a first insertion groove 1012*a* extending in the optical axis direction along an inner edge of the upper surface of the right side wall of the housing 1010 and formed in an inner portion of the upper surface of the right side wall of the housing 1010, a second insertion groove 1012*b* extending downwardly perpendicular to the optical axis direction from a right side of the first insertion groove 1011*a* and formed in an outer surface of the right side wall of the housing 1010, and a third insertion groove 1012*c* extending downwardly perpendicular to the optical axis direction and formed in the outer surface of the rear wall of the housing 1010.

The second frame 1062*a* may be inserted into the first insertion groove 1012*a*, the first side wall mounting portion 1062*e* may be inserted into the second insertion groove 1012*b*, and the second rear wall mounting portion 1062*f* may be inserted into the third insertion groove 1012*c*. The second frame 1062*a*, the second side wall mounting portion 1062*e*, and the second rear wall mounting portion 1062*f* may be additionally attached to the housing 1010 by an adhesive.

To provide a space for accommodating the second extension portion 1062*b* and the second damping member 1062*c*, a first space portion 1211 may be provided in the upper portion of the first lens barrel 1210.

Therefore, the second lens barrel 1220 may be controlled to move only between the rear surface of the right protruding wall 1009 and the front surface of the second damping member 1062*c* disposed in front of the inner surface of the rear wall of the housing 1010.

Figure 14:
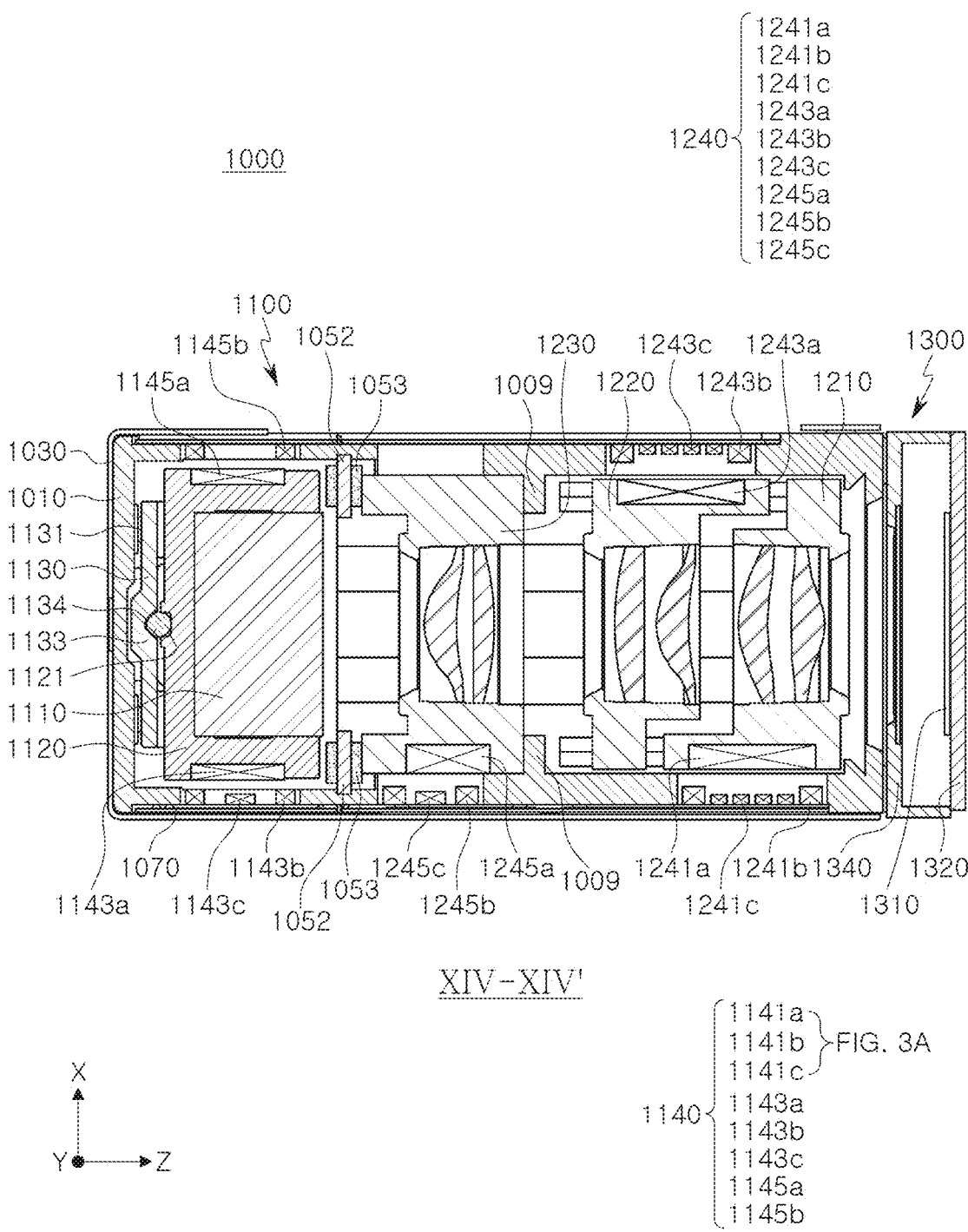
FIG. 14 is a cross-sectional view of another example of a camera module taken along the line XIV-XIV' in FIG. 2 in which a third lens barrel of a zoom lens is fixed at a predetermined position.

Referring to FIG. 14, an example of a structure for fixing a position at which the third lens barrel 1230 of a zoom lens is disposed in the housing 1010 will be described.

The housing 1010 of a camera module in this example may be provided with the damper 1050 for supporting the rotating holder 1120, and the damping members 1053 may be provided on the extension portions 1052 to protrude toward and away from the rotating holder 1120 in the optical axis direction. The protruding walls 1009 that protrude into the internal space of the housing 1010 and partition the internal space of the housing 1010 into a space in which the first and second lens barrels 1210 and 1220 are disposed and a space in which the third lens barrel 1230 is disposed may be provided.

The third lens barrel 1230 may be disposed in the housing 1010 so that the front surfaces of the protruding walls 1009 are used as assembly reference surfaces and the front side of the third lens barrel 1230 is supported by the damping members 1053. Since the damping members 1053 are made of an elastic material, the third lens barrel 1230 may be disposed between the damping members 1053 and the protruding walls 1009 by slightly compressing the damping members 1053. Alternatively, the third lens barrel 1230 may be disposed in the housing first, and then the damping members 1053 of the damper 1050 may be inserted to press the third lens barrel 1230 against the protruding walls 1009. In addition, an adhesive may be injected between the third lens barrel 1230 and the side walls of the housing 1010 and/or the bottom surface of the housing 1010 to bond the third lens barrel 1230 and the housing 1010 to each other.

Figure 15:
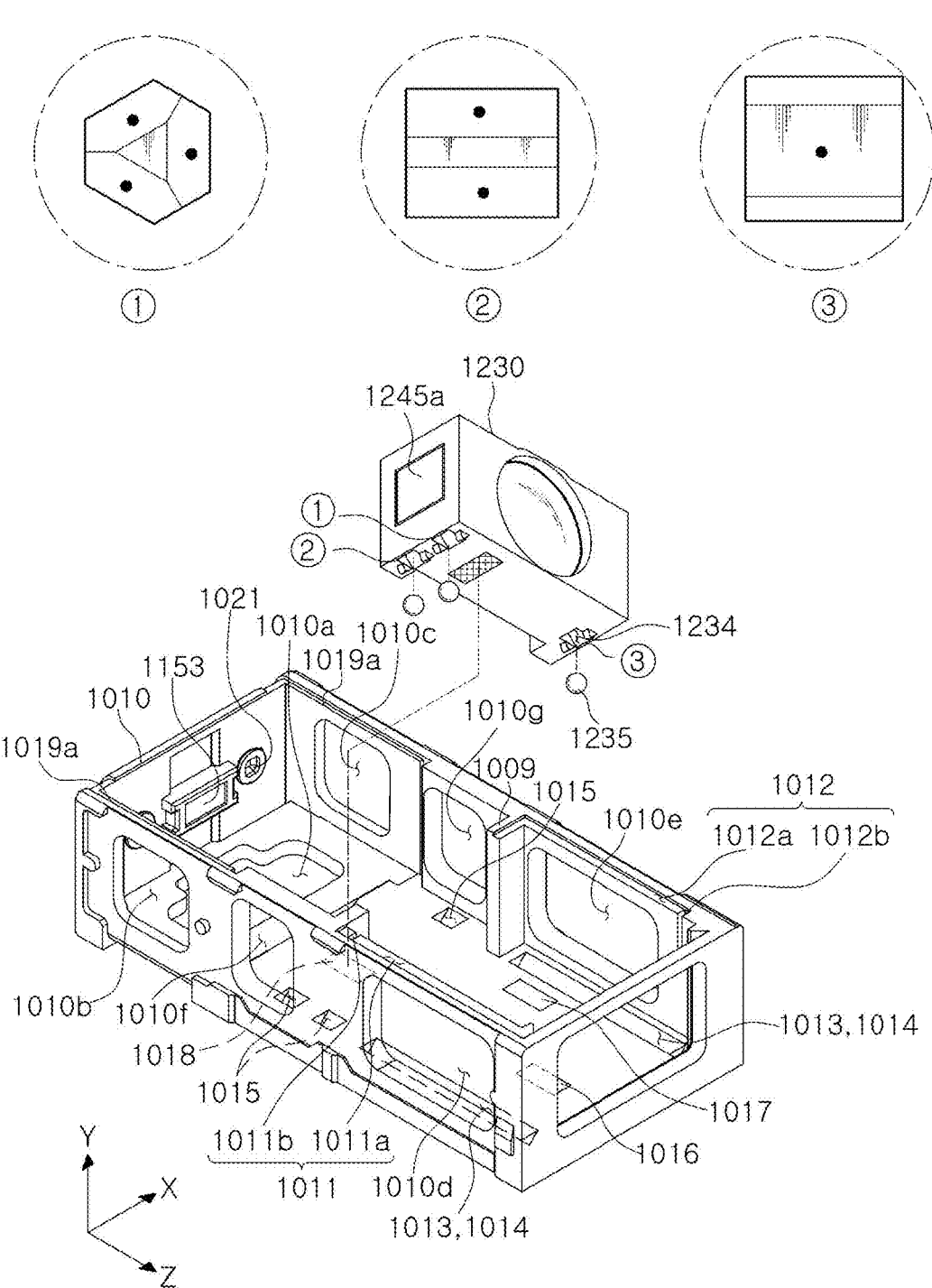
FIGS. 15 and 16 are exploded perspective views of examples of a housing and a third lens barrel of a zoom lens of a camera module in which the third lens barrel is accurately fixed at a predetermined position.
Figure 16:
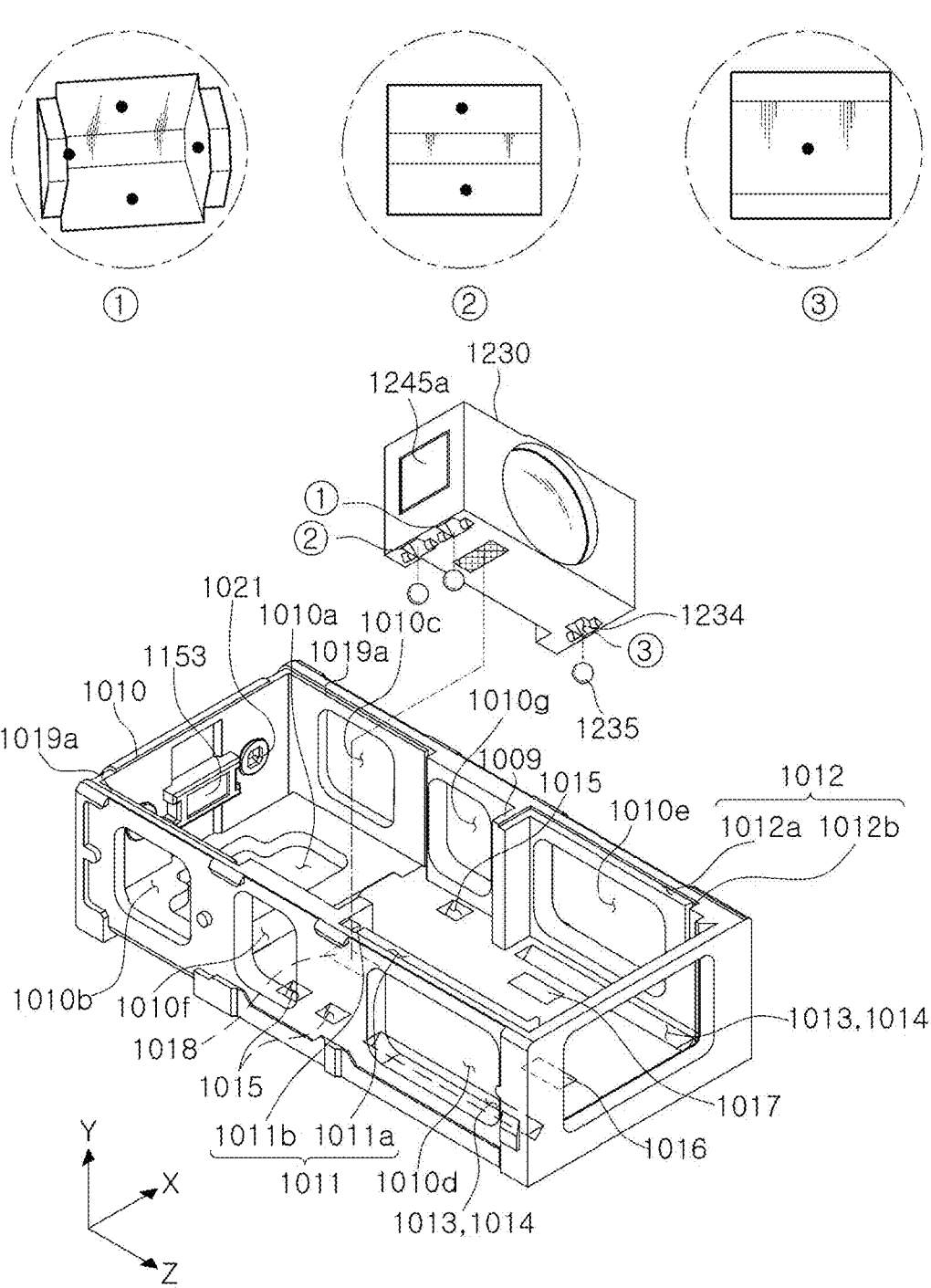

Referring to FIGS. 15 and 16, examples of a structure in which the third lens barrel 1230 of a zoom lens is accurately fixed at a predetermined position will be described.

In these examples, since the third lens barrel 1230 is fixed to the housing 1010, bearings needed to enable the third lens barrel 1230 to move in the optical axis direction may be unnecessary in principle. These examples disclose structures in which the third lens barrel 1230 is accurately disposed at a predetermined position in the housing 1010 using ball members. After the third lens barrel 1230 is disposed in the housing 1010, an adhesive may be injected between the third lens barrel 1230 and the side walls of the housing 1010 and/or the bottom surface of the housing 1010 to bond the third lens barrel 1230 and the housing 1010 to each other.

First, referring to FIG. 15, the third lens barrel 1230 may be mounted by disposing three ball members 1235 between a lower surface of the third lens barrel 1230 and a bottom surface of the housing 1010. Three pairs of guide grooves 1234 and 1015 into which the three ball members 1235 are respectively partially inserted may be respectively provided in portions of the lower surface of the third lens barrel 1230 and the bottom surface of the housing 1010 that face each other, with one pair of guide grooves 1234 and 1015 being provided individually for each ball member 1235. However, this is just an example, and four or more ball members 1235 and four or more pairs of guide grooves 1234 and 1015 may be provided.

Each of the guide grooves 1234 and 1015 in a first pair of the three pairs of guide grooves 1234 and 1015 have a first shape illustrated in the enlarged view ① in FIG. 15. Each of the guide grooves 1234 and 1015 in a second pair of the three pairs of guide grooves 1234 and 1015 have a second shape illustrated in the enlarged view ② in FIG. 15. Each of the guide grooves 1234 and 1015 in a third pair of the three pairs of guide grooves 1234 and 1015 have a third shape illustrated in the enlarged view ③ in FIG. 15. The second shape is different from the first shape, and the third shape is different from the first shape and the second shape.

The guide groove 1234 or 1015 in the enlarged view ① in FIG. 15 has a shape of a triangular pyramid having its corners cut off, or a shape of a triangular pyramid having its corners cut off and having its tip cut off to form a flat bottom surface, which allows the corresponding ball member 1235 to contact only the three surfaces of the guide groove 1234 or 1015 marked with a dot in the enlarged view ① in FIG. 15, and constrains the third lens barrel 1230 in the optical axis (the Z-axis) direction, the X-axis direction perpendicular to the optical axis direction, and the Y-axis direction perpendicular to the optical axis direction and the X axis direction.

The guide groove 1234 or 1015 in the enlarged view ② in FIG. 15 extends in the optical axis direction and has a shape of a V, or a shape of a V having its tip cut off to form a flat bottom surface, which allows the corresponding ball member 1235 to contact only the two surfaces of the guide groove 1234 or 1015 marked with a dot in the enlarged view ② in FIG. 15, and constrains the third lens barrel 1230 in the X-axis direction and the Y-axis direction.

The guide groove 1234 or 1015 in the enlarged view ③ in FIG. 15 extends in the optical axis direction and has vertical sides and a flat bottom surface, which allows the corresponding ball member 1235 to contact only the one surface of the guide groove 1234 or 1015 marked with a dot in the enlarged view ③ in FIG. 15, and constrains the third lens barrel 1230 in the Y-axis direction.

Since the third lens barrel 1230 is constrained in the X-axis direction, the Y-axis direction, and the optical axis (the Z-axis) direction by the guide grooves 1234 and 1015 having the shapes illustrated in the enlarged views ①, ②, and ③ in FIG. 15, the third lens barrel 1230 may be accurately positioned in the housing 1010 simply by inserting the ball members 1235 into the guide grooves 1015 in the bottom surface of the housing 1010, and then placing the third lens barrel 1230 into the housing 1010 so that the guide grooves 1234 in the lower surface of the housing 1010 fit over the ball members 1235 in the guide grooves 1015.

Alternatively, referring to FIG. 16, the third lens barrel 1230 may be mounted by disposing three ball members 1235 between a lower surface of the third lens barrel 1230 and a bottom surface of the housing 1010. Three pairs of guide grooves 1234 and 1015 into which the ball members 1235 are respectively partially inserted may be respectively provided in portions of the lower surface of the third lens barrel 1230 and the bottom surface of the housing 1010 that face each other, with one pair of guide grooves 1234 and 1015 being provided individually for each ball member 1235. However, this is just an example, and four or more ball members 1235 and four or more pairs of guide grooves 1234 and 1015 may be provided.

A first guide groove of the guide grooves 1234 and 1015 in a first pair of the three pairs of guide grooves 1234 and

1015 has a first shape illustrated in the enlarged view ① in FIG. 16 in which side walls have protrusions. A second guide groove of the guide grooves 1234 and 1015 in the first pair of the three pairs of guide grooves 1234 and 1015 has a modified first shape similar to the first shape illustrated in the enlarged view ① in FIG. 16, except that the side walls have recesses to receive the protrusions of the side walls of the first guide groove. Each of the guide grooves 1234 and 1015 in a second pair of the three pairs of guide grooves 1234 and 1015 have a second shape illustrated in the enlarged view ② in FIG. 16. Each of the guide grooves 1234 and 1015 in a third pair of the three pairs of guide grooves 1234 and 1015 have a third shape illustrated in the enlarged view ③ in FIG. 16. The second shape is different from the first shape and the modified first shape, and the third shape is different from the first shape, the modified first shape, and the second shape.

A guide groove in the enlarged view ① in FIG. 16 is a first guide groove of the guide grooves 1234 and 1015 in the first pair of the three pairs of guide grooves 1234 and 1015, and extends in the optical axis (the Z-axis) direction and has a shape of a V, or a shape of a V having its tip cut off to form a flat bottom surface, and further has side walls extending in the X-axis direction perpendicular to the optical axis direction, the side walls having protrusions extending in the Y-axis direction perpendicular to the optical axis direction and the X-axis direction, which allows the corresponding ball member 1235 to contact only the four surfaces of the first guide groove marked with a dot in the enlarged view ① in FIG. 16, and constrains the third lens barrel 1230 in the optical axis direction, the X-axis direction, and the Y-axis direction.

A second guide groove of the guide grooves 1234 and 1015 in the first pair of the three pairs of guide grooves 1234 and 1015 has a shape similar to the shape of the first guide groove of the guide grooves 1234 and 1015 in the first pair of the three pairs of guide grooves 1234 and 1015 illustrated in the enlarged view ① in FIG. 16, except that the side walls of the second guide groove have recesses to receive the protrusions of the side walls of the first guide groove illustrated in the enlarged view ① in FIG. 16, which allows the corresponding ball member 1235 to contact only the two surfaces of the V of the second guide groove marked with a dot in the enlarged view ① in FIG. 16. However, the third lens barrel 1230 is nevertheless constrained in the optical axis direction, the X-axis direction, and the Y-axis direction by the first guide groove as discussed above.

The guide groove 1234 or 1015 in the enlarged view ② in FIG. 16 extends in the optical axis direction and has a shape of a V, or a shape of a V having its tip cut off to form a flat bottom surface, which allows the corresponding ball member 1235 to contact only the two surfaces of the guide groove 1234 or 1015 marked with a dot in the enlarged view ② in FIG. 16, and constrains the third lens barrel 1230 in the X-axis direction and the Y-axis direction.

The guide groove 1234 or 1015 in the enlarged view ③ in FIG. 16 extends in the optical axis direction and has vertical sides and a flat bottom surface, which allows the corresponding ball member 1235 to contact only the one surface of the guide groove 1234 or 1015 marked with a dot in the enlarged view ③ in FIG. 15, and constrains the third lens barrel 1230 in the Y-axis direction.

Since the third lens barrel 1230 is constrained in the X-axis direction, the Y-axis direction, and the optical axis (the Z-axis) direction by the guide grooves 1234 and 1015 having the shapes illustrated in the enlarged views ①, ②, and ③ and the modified shape discussed above that is similar to the shape illustrated in the enlarged view ①, the third lens barrel 1230 may be accurately positioned in the housing 1010 simply by inserting the ball members 1235 into the guide grooves 1015 in the bottom surface of the housing 1010, and then placing the third lens barrel 1230 into the housing 1010 so that the guide grooves 1234 in the lower surface of the housing 1010 fit over the ball members 1235 in the guide grooves 1015.

Figure 17:
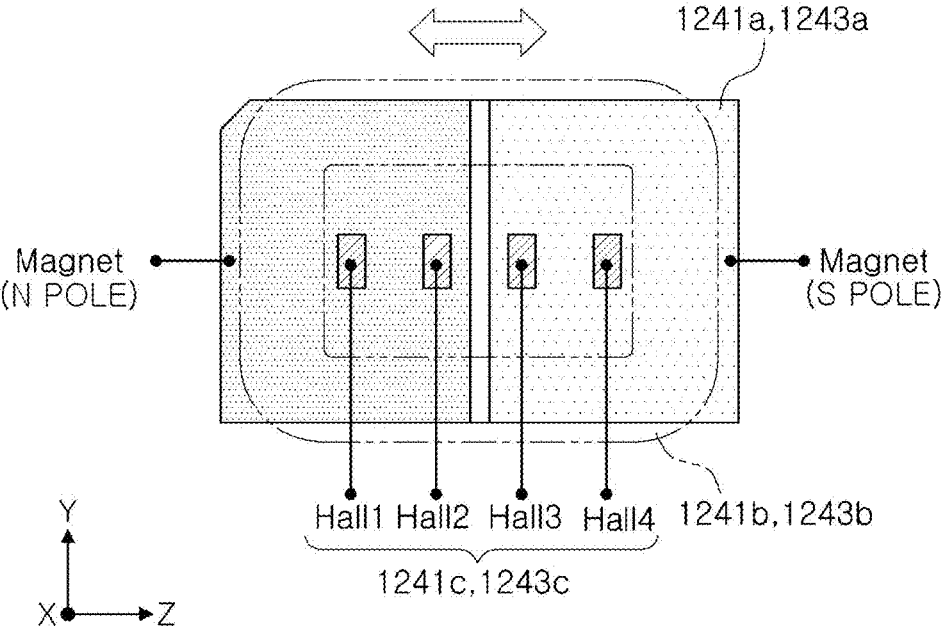
FIG. 17 is a view of an example of a positional relationship between a magnet disposed on a first or second lens barrel of a zoom lens of a camera module and four Hall sensors of a position sensor opposing the magnet.
Figure 18:
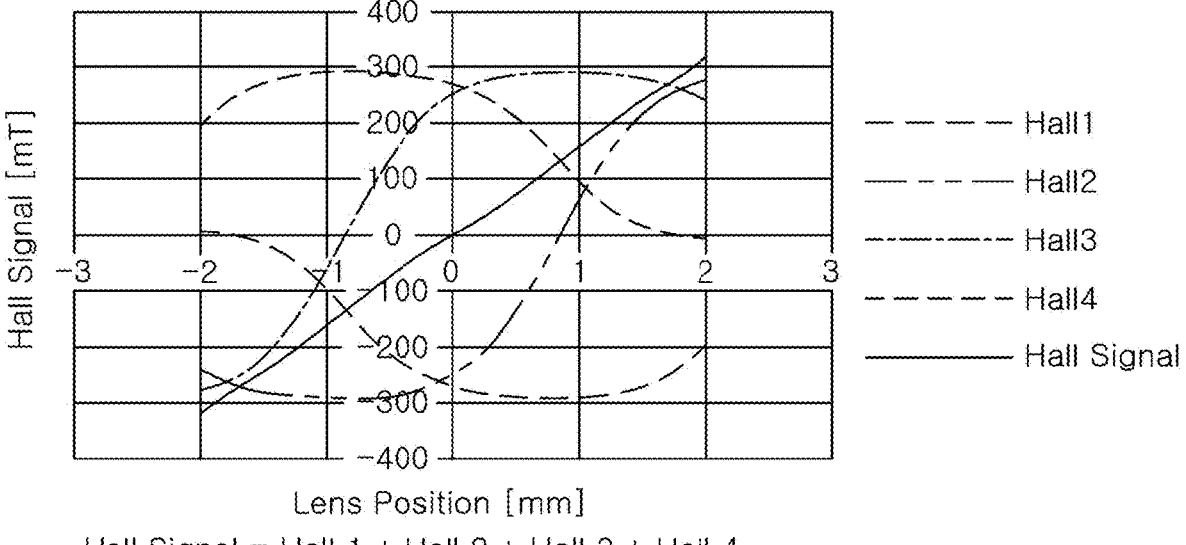
FIG. 18 is a graph of an example of output signals of the four Hall sensors with respect to a position of the magnet in the optical axis direction for the positional relationship illustrated in FIG. 17.

FIG. 17 is a view of an example of a positional relationship between a magnet disposed on a first or second lens barrel of a zoom lens of a camera module and four Hall sensors of a position sensor opposing the magnet, and FIG. 18 is a graph of an example of output signals of the four Hall sensors with respect to a position of the magnet in the optical axis direction for the positional relationship illustrated in FIG. 17.

Referring to FIG. 17, the first or second lens barrel 1210 or 1220 may move a considerable distance in the optical axis direction to perform a zoom or AF function, and a position of the first or second lens barrel 1210 or 1220 in the optical axis direction needs to be sensed by the Hall sensor 1241c or 1243c as accurately as possible.

Therefore, in this example, the position sensor 1241c or 1243c includes four Hall sensors Hall1 to Hall4 disposed to face the magnet 1241a or 1243a of the first or second lens barrel 1210 or 1220. In this example, the magnet 1241a or 1243a may be magnetized to form a two-pole magnet having N and S poles (or alternatively S and N poles) in a moving direction (indicated by the arrow in FIG. 17) of the first or second lens barrel 1210 or 1220 in the optical axis direction, and the magnet 1241a or 1243a may be disposed to oppose a coil 1241b or 1243b. When the magnet 1241a or 1243a is centered with respect to the coil 1241b or 1243b, two of the Hall sensors Hall1 and Hall2 oppose the N pole (or alternatively the S pole) of the magnet 1241a or 1243a, and the remaining two Hall sensors Hall3 and Hall4 oppose the S pole (or alternatively the N pole) of the magnet 1241a or 1243a. The four Hall sensors Hall1 to Hall4 may be arranged side by side inside the coil 1241b or 1243b in the moving direction of the magnet 1241a or 1243a. In detail, the four Hall sensors Hall1 to Hall4 may be spaced apart from each other by the same distance, they may be disposed symmetrically about a neutral region (indicated by the white strip between the N and S poles) of the magnet 1241a or 1243a.

Referring to FIG. 18, when the magnet 1241a or 1243a moves in a + or − direction in the optical axis direction, output signals of the four Hall sensors Hall1 to Hall4 vary in different ways with respect to a position of the magnet 1241a or 1243a in the optical axis direction, but a Hall signal calculated according to the equation Hall signal=Hall1+Hall2+Hall3+Hall4 varies approximately linearly with respect to the position of the magnet 1241a or 1243a in the optical axis direction.

When the magnet 1241a or 1243a moves a relatively long distance in the optical axis direction, it may be difficult to accurately sense the position of the magnet 1241a or 1243a in the optical axis direction using only one or two Hall sensors. However, by using the four Hall sensors Hall1 to Hall4 as illustrated in FIG. 17, accurate position sensing is possible even when the magnet 1241a or 1243a moves a relatively long distance as illustrated in FIG. 18.

Figure 19:
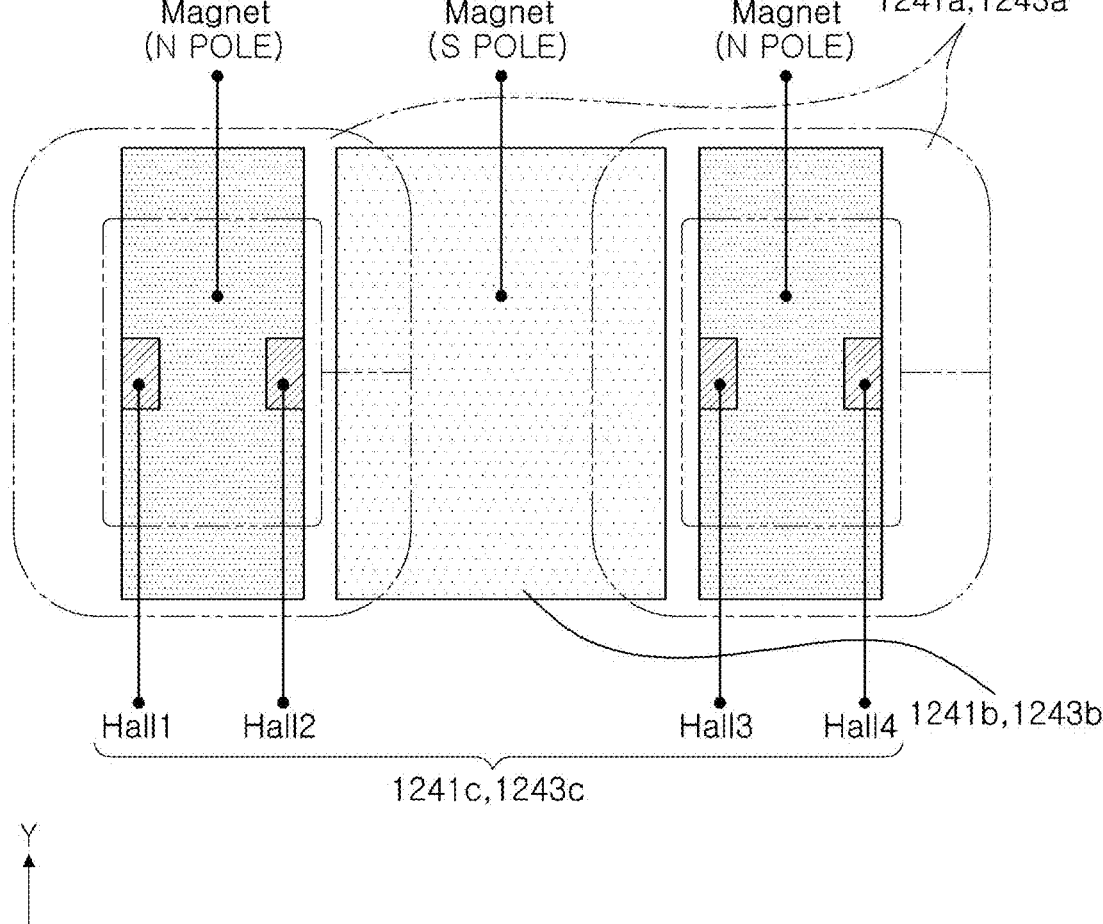
FIG. 19 is a view of another example of a positional relationship between a magnet disposed on a first or second lens barrel of a zoom lens of a camera module and four Hall sensors of a position sensor opposing the magnet.
Figure 20:
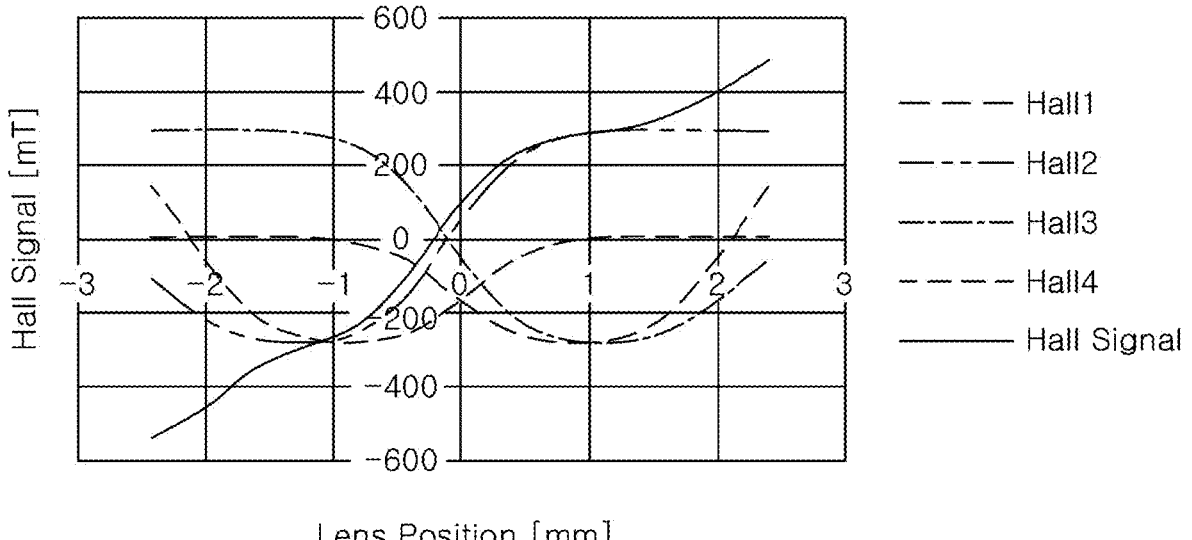
FIG. 20 is a graph of an example of output signals of the four Hall sensors with respect to a position of the magnet in the optical axis direction for the positional relationship illustrated in FIG. 19.

FIG. 19 is a view of another example of a positional relationship between a magnet disposed on a first or second lens barrel of a zoom lens of a camera module and four Hall sensors of a position sensor opposing the magnet, and FIG. 20 is a graph of an example of output signals of the four Hall sensors with respect to a position of the magnet in the optical axis direction for the positional relationship illustrated in FIG. 19.

Referring to FIG. 19, the first or second lens barrel 1210 or 1220 may move a considerable distance in the optical axis direction to perform a zoom or AF function, and a position of the first or second lens barrel 1210 or 1220 in the optical axis direction needs to be sensed by the position sensor 1241c or 1243c as accurately as possible.

Therefore, in this example, the position sensor 1241c or 1243c includes four Hall sensors Hall1 to Hall4 disposed to face the magnet 1241a or 1243a of the first or second lens barrel 1210 and 1220. In this example, the magnet 1241a or 1243a may be magnetized to form a three-pole magnet having N, S, and N poles (or alternatively S, N, and S poles) in a moving direction of the first or second lens barrel 1210 or 1220, in the optical axis direction and the magnet 1241a or 1243a may be disposed to oppose a coil 1241b or 1243b provided as a set of two coils. When the magnet 1241a or 1243a is centered with respect to the coil 1241b or 1243b, the two coils of the coil 1241a or 1243a are respectively centered with respect to the two N poles on opposite sides of the S pole (or alternatively with respect to the two S poles on opposite sides of the N pole).

When the magnet 1241a or 1243a is centered with respect to the coil 1241b or 1243b, two of the Hall sensors Hall1 and Hall2 oppose the N pole (or alternatively the S pole) on the left side of the magnet 1241a or 1243a so that a left edge of the Hall sensor Hall1 is aligned with a left edge of the N pole (or alternatively the S pole), and a right edge of the Hall sensor Hall2 is aligned with a right edge of the N pole (or alternatively the S pole). The remaining two Hall sensors Hall3 and Hall4 oppose the N pole (or alternatively the S pole) on the right side of the magnet 1241a or 1243a so that a left edge of the Hall sensor Hall3 is aligned with a left edge of the N pole (or alternatively the S pole), and a right edge of the Hall sensor Hall4 is aligned with a right edge of the N pole (or alternatively the S pole).

Referring to FIG. 20, when the magnet 1241a or 1243a moves in a + or − direction in the optical axis direction, output signals of the four Hall sensors vary in different ways with respect to a position of the magnet 1241a or 1243a in the optical axis direction, but a Hall signal calculated according to the equation Hall signal=(Hall1+Hall2)−(Hall3+Hall4) varies approximately linearly with respect to the position of the magnet 1241a or 1243a in the optical axis direction.

When the magnet 1241a or 1243a moves a relatively long distance in the optical axis direction, it may be difficult to accurately sense the position of the magnet 1241a or 1243a in the optical axis direction using only one or two Hall sensors. However, by using the four Hall sensors Hall1 to Hall4 as illustrated in FIG. 19, accurate position sensing is possible even when the magnet 1241a or 1243a moves a relatively long distance as illustrated in FIG. 20.

Figure 21:
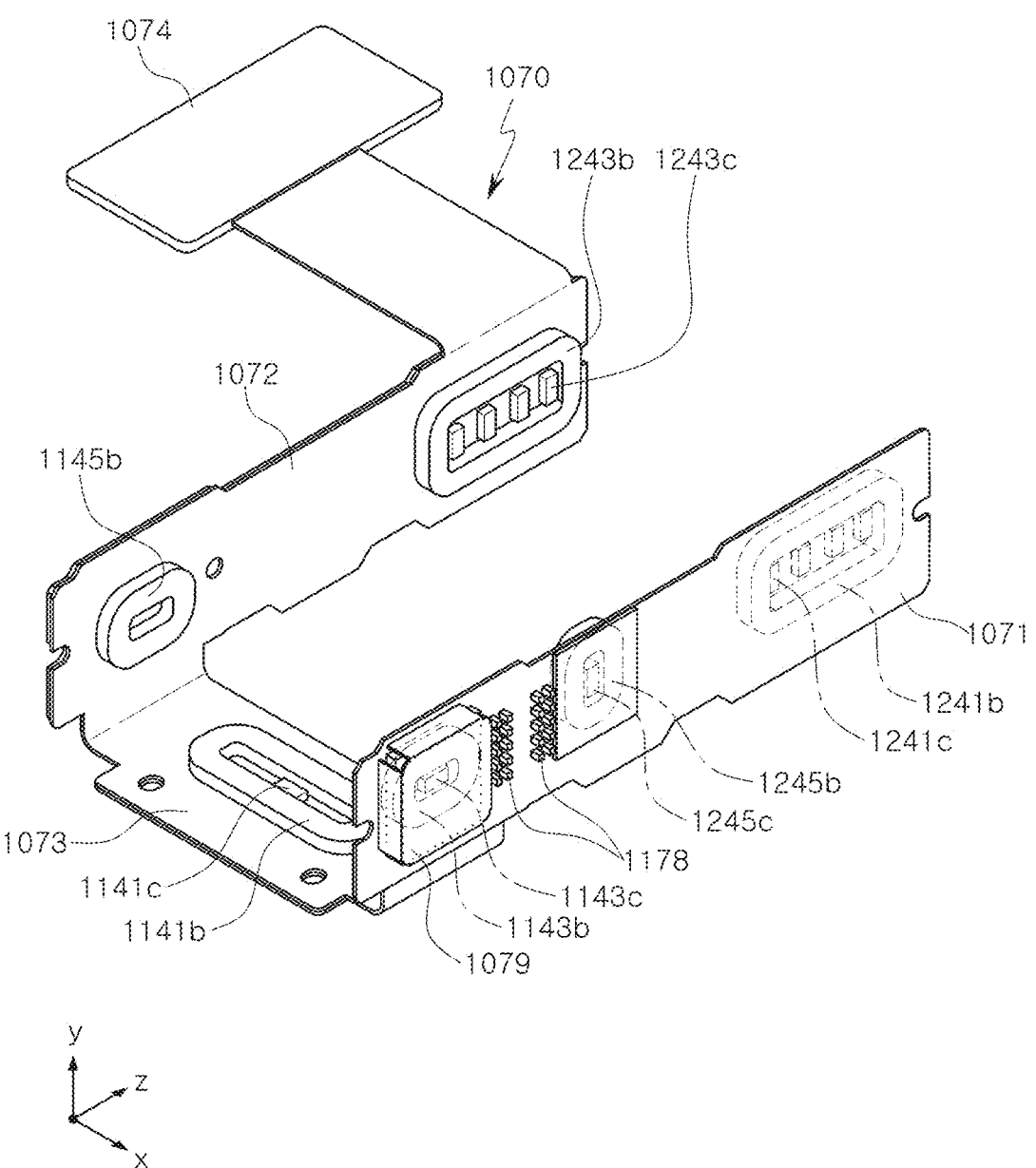
FIG. 21 is a perspective view of an example of a main board having coils and components mounted thereon.

FIG. 21 is a perspective view of an example of a main board having coils and components mounted thereon.

Referring to FIG. 21, the coils 1141b, 1143b, and 1145b and the position sensors 1141c and 1143c of the first driving portion 1140 for driving the reflection module 1100, and the coils 1241b, 1243b, and 1245b and the position sensors 1241c, 1243c, and 1245c of the second driving portion 1240 for driving the lens module 1200, may be mounted on an internal surface of a main board 1070. Furthermore, components 1178, such as passive elements and active elements, and a gyro sensor 1079 may be mounted on an external surface of the main board 1070. Therefore, the main board 1070 may be a double-sided main board.

Specifically, the main board 1070 may include first and second side boards 1071 and 1072 disposed approximately parallel to each other, and a bottom board 1073 connecting the first and second side boards 1071 and 1072 to each other. A single terminal portion 1074 for connecting the camera module to an external power supply and external signal lines may be connected to any one of the first and second side boards 1071 and 1072 and the bottom board 1073.

The coil 1143*b* and the position sensor 1143*c* of the first driving portion 1140 for driving the reflection module 1100, and the coils 1241*b* and 1245*b* and the position sensors 1241*c* and 1245*c* of the second driving portion 1240 for driving the lens module 1200, may be mounted on the first side board 1071.

The coil 1145*b* of the first driving portion 1140 for driving the reflection module 1100, and the coil 1243*b* and the position sensor 1243*c* of the second driving portion 1240 for driving the lens module 1200, may be mounted on the second side board 1072.

The coil 1141*b* and the position sensor 1141*c* of the first driving portion 1140 for driving the reflection module 1100 may be mounted on the bottom board 1073.

Although the first side board 1071 is illustrated in the drawings as having components 1178, such as passive elements and active elements, and the gyro sensor 1079 mounted thereon, the components 1178 and the gyro sensor 1079 may be mounted on the second side board 1072, or may be suitably divided and mounted on the first and second side boards 1071 and 1072.

Furthermore, the coils 1141*b*, 1143*b*, 1145*b*, 1241*b*, 1243*b*, and 1245*b* and the position sensors 1141*c*, 1143*c*, 1241*c*, 1243*c*, and 1245*c*, which may be mounted on the first side board 1071, the second side board 1072, and the bottom board 1073 as illustrated in FIG. 21, may be variously divided and mounted on the first side board 1071, the second side board 1072, and the bottom board 1073 according to the design of a camera module.

Figure 22:
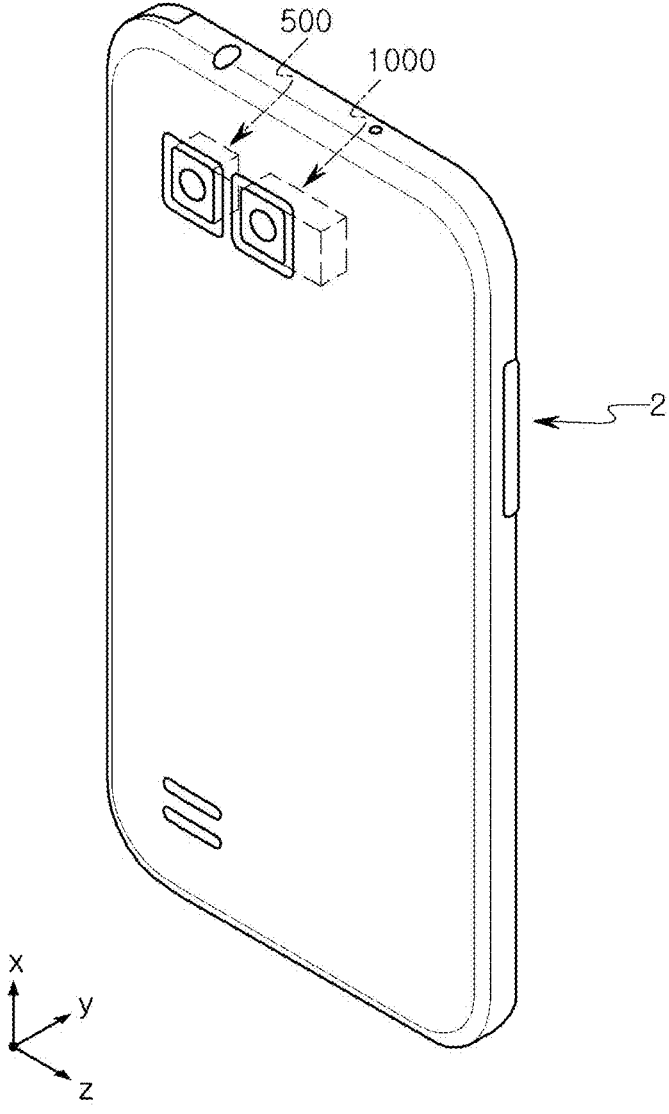
FIG. 22 is a perspective view of another example of a portable electronic device.

FIG. 22 is a perspective view of another example of a portable electronic device.

Referring to FIG. 22, a portable electronic device 2 may be a portable electronic device in which a plurality of camera modules 500 and 1000 are mounted, such as a mobile communications terminal, a smartphone, or a tablet PC.

The plurality of camera modules 500 and 1000 may be mounted in the portable electronic device 2.

At least one of the plurality of camera modules 500 and 1000 may be the camera module 1000 described with reference to FIGS. 2 through 21.

For example, in the case of the portable electronic device 2 including two camera modules 500 and 1000, at least one of two camera modules 500 and 1000 may be the camera module 1000.

The examples described above enable the camera module and the portable electronic device including the camera module to have a simple structure, a reduced size, and a reduced power consumption while implementing the AF function, the zoom function, and the OIS function.

In addition, the examples described above enable easy alignment of a plurality of lens barrels of a lens module in an optical axis direction.

In addition, the examples described above include a stopper and a damper to prevent the lens barrels of a zoom lens and a reflection module from being displaced from optimal positions.

In addition, the examples described above enable the performance of a zoom lens to be maximized by accurately measuring positions of the lens barrels of the zoom lens in the optical axis direction using a position sensor including a plurality of Hall sensors.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   at least one lens barrel including a first lens barrel disposed in the housing and to be movable in an optical axis direction;
   a reflection module disposed in front of the first lens barrel and to be rotatable with respect to the housing;
   a driving portion comprising a magnet disposed on the first lens barrel and a coil disposed to face the magnet in a first axis direction perpendicular to the optical axis direction, and
   a first plurality of ball bearings disposed between the first lens barrel and the housing,
   wherein a pulling magnet is disposed on the first lens barrel, and a pulling yoke facing the pulling magnet is disposed on the housing,
   wherein the first lens barrel comprises one side surface and the other side surface spaced apart in the first axis direction, and the magnet is disposed on the one side surface of the first lens barrel,
   wherein a total number of the first plurality of ball bearings is three, and
   two ball bearings among the three ball bearings are disposed closer to the one side surface than to the other side surface.

2. The camera module of claim 1, wherein a remaining one ball bearing among the three ball bearings is disposed closer to the other side surface than to the one side surface.

3. The camera module of claim 2, wherein the pulling magnet is disposed closer to the two ball bearings than to the one ball bearing.

4. The camera module of claim 1, wherein two ball bearings are disposed in a space between the one side surface of the lens barrel and the pulling magnet.

5. The camera module of claim 1, wherein the two ball bearings are spaced apart in the optical axis direction.

6. The camera module of claim 1, wherein the pulling magnet and the pulling yoke face each other in a second axis direction perpendicular to both the optical axis direction and the first axis direction.

7. The camera module of claim 1, wherein a plurality of guide grooves in which the three ball bearings are disposed are formed on a lower surface of the lens barrel, wherein the lens barrel comprises an extension portion extending in the optical axis direction, and wherein some of the plurality of guide grooves extend to a lower surface of the extension portion.

8. The camera module of claim 7, wherein one of two ball bearings is disposed between the lower surface of the extension portion and the housing.

9. The camera module of claim 1, wherein the housing has a through-hole, and the magnet and the coil face each other directly through the through-hole.

10. The camera module of claim 1, wherein one surface of the magnet facing the coil has an N-pole, a neutral region, and an S-pole along the optical axis direction.

11. The camera module of claim 1, wherein a position sensor is disposed inside the coil.

12. The camera module of claim 1, further comprising a plurality of magnets disposed on the reflection module and a plurality of coils facing the plurality of magnets, wherein the housing comprises a plurality of through-holes, and the plurality of magnets and the plurality of coils face each other directly through the plurality of through-holes.

13. The camera module of claim 12, wherein one magnet among the plurality of magnets is disposed on a bottom surface of the reflection module, and two magnets among the plurality of magnets are disposed on one side surface and the other side surface of the reflection module.

14. The camera module of claim 12, wherein a position sensor is disposed inside the plurality of coils.

15. The camera module of claim 12, wherein a main board is disposed on the housing, and the coil and the plurality of coils are disposed on the main board.

16. The camera module of claim 1, wherein a ball bearing is disposed between the reflection module and the housing.

17. The camera module of claim 1, wherein an elastic damper is disposed between the reflection module and the lens barrel.

* * * * *